(12) United States Patent
Xu et al.

(10) Patent No.: US 11,038,197 B2
(45) Date of Patent: Jun. 15, 2021

(54) AQUEOUS AND HYBRID ELECTROLYTES WITH WIDE ELECTROCHEMICAL STABILITY WINDOWS

(71) Applicants: University of Maryland, College Park, College Park, MD (US); The United States of America as Represented by the Secretary of the Army, Washington, DC (US)

(72) Inventors: Kang Xu, Potomac, MD (US); Arthur Von Wald Cresce, Beltsville, MD (US); Oleg A. Borodin, Laurel, MD (US); Chunsheng Wang, Silver Spring, MD (US); Liumin Suo, Greenbelt, MD (US)

(73) Assignees: University of Maryland, College Park, College Park, MD (US); The United States of America as Represented By The Secretary of the Army, Washington, DC (US)

(*) Notice: Subject to any disclaimer, the term of this patent is extended or adjusted under 35 U.S.C. 154(b) by 268 days.

(21) Appl. No.: 15/763,652

(22) PCT Filed: Sep. 28, 2016

(86) PCT No.: PCT/US2016/054155
§ 371 (c)(1),
(2) Date: Mar. 27, 2018

(87) PCT Pub. No.: WO2017/105578
PCT Pub. Date: Jun. 22, 2017

(65) Prior Publication Data
US 2018/0277903 A1  Sep. 27, 2018

Related U.S. Application Data

(60) Provisional application No. 62/233,902, filed on Sep. 28, 2015.

(51) Int. Cl.
| | | |
|---|---|---|
| *H01M 10/056* | (2010.01) | |
| *H01M 4/505* | (2010.01) | |
| *H01M 4/58* | (2010.01) | |
| *H01M 4/525* | (2010.01) | |
| *H01M 10/36* | (2010.01) | |
| *H01M 10/0568* | (2010.01) | |
| *H01M 10/0569* | (2010.01) | |
| *H01M 10/26* | (2006.01) | |

(52) U.S. Cl.
CPC ......... *H01M 10/056* (2013.01); *H01M 4/505* (2013.01); *H01M 4/525* (2013.01); *H01M 4/5815* (2013.01); *H01M 10/0568* (2013.01); *H01M 10/0569* (2013.01); *H01M 10/26* (2013.01); *H01M 10/36* (2013.01); *H01M 2300/0002* (2013.01); *H01M 2300/0014* (2013.01); *H01M 2300/0025* (2013.01); *H01M 2300/0091* (2013.01)

(58) Field of Classification Search
CPC ........... H01M 10/056; H01M 10/0568; H01M 10/0569; H01M 4/525; H01M 4/505; H01M 4/5815; H01M 2300/0002; H01M 2300/0025; H01M 2300/0014; H01M 2300/0091
See application file for complete search history.

(56) References Cited

U.S. PATENT DOCUMENTS

| 7,582,380 B1 | 9/2009 | Dunstan et al. | |
|---|---|---|---|
| 2002/0086213 A1* | 7/2002 | Utsugi ................. | H01M 4/382 429/231.95 |
| 2010/0015514 A1 | 1/2010 | Miyagi et al. | |
| 2017/0104363 A1* | 4/2017 | Mukherjee ............ | H01M 4/525 |

FOREIGN PATENT DOCUMENTS

WO   WO 2015/116700 A1   8/2015

OTHER PUBLICATIONS

Petibon et al. "Comparative study of electrolyte additives using electrochemical impedance spectroscopy and symmetric cells". Journal ofPpower Sources, vol. 251, 2014, pp. 187-194. Available online Nov. 28, 2013.*
Burns et al. "The impact of Intentionally Added Water to the Electrolyte of Li-ion Cells: I. Cells with Graphite Negative Electrodes". Journal of the electrochemical Society (2013), 160 (11), A2281-A2287.*
Burns, J.C., et al., "Evaluation of Effects of Additives in Wound Li-Ion Cells Through High Precision Coulometry," *Journal of the Electrochemical Society* 158:A255-A261, Electrochemical Society, United States (2011).
International Search Report and Written Opinion for International Application No. PCT/US16/54155, U.S. Patent Office, United States, dated Jun. 12, 2017, 8 pages.
Li, W.., et al., "Rechargeable Lithium Batteries with Aqueous Electrolytes," *Science* 264:1115-1118, American Association for the Advancement of Science, United States (1994).
Luo, J.-Y., et al., "Aqueous Lithium-ion Battery $LiTi_2(PO_4)_3$/$LiMn_2O_4$ with High Power and Energy Densities as well as Superior Cycling Stability," *Advanced Functional Materials* 17:3877-3884, Wiley-VCH, Germany (2007).
Luo, J.-Y., et al., "Raising the cycling stability of aqueous lithium-ion batteries by eliminating oxygen in the electrolyte," *Nature Chemistry* 2:760-765, Macmillan Publishers, United Kingdom (2010).
Lux, S.F., et al., "LiTFSI Stability in Water and Its Possible Use in Aqueous Lithium-Ion Batteries: pH Dependency, Electrochemical Window and Temperature Stability," *Journal of the Electrochemical Society* 160: A1694-A1700, Electrochemical Society, United States (2013).
Qin, H., et al., "Aqueous rechargeable alkali-ion batteries with polyimide anode," *Journal of Power Sources* 249:367-372, Elsevier B.V., Netherlands (2014).

(Continued)

*Primary Examiner* — Laura Weiner
(74) *Attorney, Agent, or Firm* — Sterne, Kessler, Goldstein and Fox P.L.L.C.

(57) ABSTRACT

The present invention is directed to aqueous and hybrid aqueous electrolytes that comprise a lithium salt. The present invention is also directed to methods of making the electrolytes and methods of using the electrolytes in batteries and other electrochemical technologies.

18 Claims, 18 Drawing Sheets

(56) References Cited

OTHER PUBLICATIONS

Suo, L., et al., ""Water-in-salt" electrolyte enables high-voltage aqueous lithium-ion chemistries," *Science* 350:938-943, American Association for the Advancement of Science, United States (2015).
Wang, H., et al., "Electrochemical properties of $TiP_2O_7$ and $LiTi_2(PO_4)_3$ as anode material for lithium ion battery with aqueous solution electrolyte," *Electrochimica Acta* 52:3280-3285, Elsevier, United Kingdom (2007).
Wang, H., et al., "Improvement of cycle performance of lithium ion cell $LiMn_2O_4/Li_xV_2O_5$ with aqueous solution electrolyte by polypyrrole coating on anode," *Electrochimica Acta* 52:5102-5107, Elsevier, United Kingdom (2007).
Wessells, C., et al., "Investigations of the Electrochemical Stability of Aqueous Electrolytes for Lithium Battery Applications," *Electrochemical and Solid-State Letters* 13:A59-A61, (2010).
Kang Xu, "Nonaqueous Liquid Electrolytes for Lithium-Based Rechargeable Batteries," *Chem. Rev.* 104:4303-4417, American Chemical Society, United States (2004).

* cited by examiner

AQUEOUS AND HYBRID ELECTROLYTES WITH WIDE ELECTROCHEMICAL STABILITY WINDOWS

STATEMENT REGARDING FEDERALLY SPONSORED RESEARCH OR DEVELOPMENT

This invention was made jointly with the United States of America, as represented by the Secretary of the Army (ARL), with government support under DEAR0000389 awarded by the Department of Energy. The government has certain rights to this invention.

BACKGROUND OF THE INVENTION

Field of the Invention

The present invention is directed to aqueous and hybrid aqueous electrolytes that comprise a metal salt. The present invention is also directed to methods of making the electrolytes and methods of using the electrolytes in batteries and other electrochemical technologies.

Background of the Invention

Rechargeable batteries that output high cell voltages (>3.0 V) utilize non-aqueous and aprotic solvents to dissolve conducting salts, because these solvents are able to afford the stability against the oxidative or reductive reactions incurred by electrode surfaces of extreme potentials. Because electrolyte components are almost never thermodynamically stable on strongly reductive surfaces of the anode or strongly oxidative surfaces of the cathode, electrochemical stability is rather attained through the passivation of the electrode surfaces. The above passivation is realized by the initial decomposition of solvents in trace amount and the concomitant deposition of these decomposition products which deactivate the catalytic sites of the electrode surfaces. Almost universally in all electrochemical devices that produce cell voltages higher than 3.0 V, and particularly in Li-ion battery chemistries, certain electrolyte components were developed so that their decomposition products on anode and cathode surfaces are able to form dense and protective interphasial layers known as a solid-electrolyte interphase (SEI). These solvents include ethylene carbonate (EC), vinylene carbonate (VC), and other polar and aprotic solvents and/or additives, and have become indispensable components in all commercial Li-ion batteries. Na-ion batteries, which are receiving increased research attention and economic importance, have very similar electrolyte stability needs as Li-ion batteries, because they put very similar electrochemical strains on solvents and salt-solvent complexes of the electrolyte solution. Furthermore, multi-electron metals, such as magnesium (Mg) and aluminum (Al), are quite difficult to dissolve in aprotic non-aqueous electrolyte, which has severely hampered their development into viable rechargeable battery chemistries.

State-of-the-art battery chemistries using such non-aqueous electrolytes suffer from high flammability of these organic solvents, as well as the toxicity with the fluorophosphates anions of Li, Na, and other metal salts. Non-aqueous electrolytes used to dissolve Mg and Al are typically very dangerous and reactive Lewis acid solutions known as Grignard reagents are highly toxic and corrosive. The moisture-sensitivity and high reactivity of these non-aqueous electrolyte components also require special moisture exclusion facilities during manufacturing and processing, thus causing additional costs. In addition to the direct costs incurred by these expensive electrolyte components, the potential safety hazards associated with these highly reactive electrolyte components also adds to the final cost of the battery packs, where expensive packaging and electronic protective devices and safety management have to be used.

Aqueous electrolytes could resolve these concerns; however, their electrochemical stability window (1.23 V) is too narrow to support most of the electrochemical couples used in Li-ion batteries. In particular, hydrogen evolution at the anode presents the gravest challenge because it occurs at a potential (between approximately 2.21-3.04 V vs. Li (depending on the pH value)) far above where most Li-ion battery anode materials operate. Even in trace amounts, hydrogen severely deteriorates the electrode structure during cycling.

In contrast to non-aqueous electrolyte systems where cathode and anode materials often operate far beyond thermodynamic stability limits of electrolyte components (K. Xu, Chem. Rev. 104, 4303-4417 (2004); and K. Xu, Chem. Rev. 114, 11503-11618 (2014)), kinetic protection from a solid electrolyte interphase (SEI) in aqueous media has never been considered possible. Such interphases, occurring between electrode surfaces and electrolyte, are formed by sacrificial electrolyte decomposition during the initial charging, and constitute a barrier allowing ionic conduction but forbidding electronic conduction. Their presence significantly expands the usable electrochemical stability window of electrolytes. The absence of a protective interphase in conventional aqueous electrolytes is because none of the decomposition products from water ($H_2$, $O_2$, or OH) can deposit in dense solid state. In the absence of interphases, aqueous Li-ion batteries were typically limited to low voltage (<1.5 V) and low energy density (<70 Wh/Kg), often with rapid capacity fading and low Coulombic efficiency. The latter became especially pronounced at low C-rates.

Aqueous electrolytes have been tested in place of state-of-the-art non-aqueous electrolytes to resolve the issues of safety, cost and toxicity, but the narrow electrochemical stability window achieved with the aqueous electrolytes (1.23 V) sets an intrinsic limit on the battery chemistries that can be allowed in the aqueous media. These limits were defined by the reduction and oxidation of water molecule, where hydrogen and oxygen are evolved respectively. The expansion of that narrow window of 1.23 V was attempted, but the maximum window width obtained so far was in the neighborhood of 1.5 V, and the existence of SEI has not previously been described for any aqueous electrolytes.

The present invention describes a new class of electrolytes based on water or a mixture of water and non-aqueous solvent that are sufficient stable to accommodate Li-ion and Na-ion battery chemistries and when employed in fuel cells can operate with cell voltages between 2-3 V. These aqueous and hybrid electrolytes are able to accommodate high concentrations of various metal salts.

BRIEF SUMMARY OF THE INVENTION

The present invention provides an electrolyte, comprising:
 (a) at least one metal salt; and
 (b) a solvent comprising between about 1% and about 100% water by weight;
wherein the molal concentration of the metal salt in the electrolyte is at least 15 m when water is the only solvent or the molal concentration of the metal salt in the electrolyte is at least 5 m when the solvent comprises water and a non-aqueous solvent, and wherein the electrochemical stability window of the electrolyte is greater than 2.0 V.

In some embodiments, the at least one metal salt comprises a metal ion selected from the group consisting of $Li^+$, $Na^+$, $K^+$, $Mg^{2+}$, and $Al^{3+}$.

In some embodiments, the at least one metal salt comprises an anion selected from the group consisting of bis(trifluoromethane sulfonyl)imide (TFSI), trifluoromethane sulfonate (TF), bis(fluorosulfonyl)imide (FSI), tetrafluorophosphate ($BF_4$), hexafluorophosphate ($PF_6$), bis(pentafluoroethane sulfonyl) imide (BETI), 4,5-dicyano-2-trifluoromethanoimidazole (DCMI), [fluoro(nonafluorobutane)sulfonyl]imide (FNF), perchlorate ($ClO_4$), sulfate ($SO_4$), and nitrate ($NO_3$).

In some embodiments, the at least one metal salt comprises an anion comprising at least one fluorine atom.

In some embodiments, the at least one metal salt comprises an anion selected from the group consisting of bis(trifluoromethane sulfonyl)imide (TFSI), trifluoromethane sulfonate (TF), bis(fluorosulfonyl)imide (FSI), tetrafluorophosphate ($BF_4$), hexafluorophosphate ($PF_6$), bis(pentafluoroethane sulfonyl) imide (BETI), 4,5-dicyano-2-trifluoromethanoimidazole (DCMI), and [fluoro(nonafluorobutane) sulfonyl]imide (FNF).

In some embodiments, the at least one metal salt is selected from the group consisting of LiTFSI, LiTF, LiFSI, LiBETI, LiDCMI, LiFNF, $LiClO_4$, $LiSO_4$, $LiNO_3$, NaTFSI, NaTF, NaFSI, NaBETI, NaDCMI, NaFNF, $NaClO_4$, $NaSO_4$, $NaNO_3$, KTFSI, KTF, KFSI, KBETI, KDCMI, KFNF, $KClO_4$, $KSO_4$, $KNO_3$, $Mg(TFSI)_2$, $Mg(TF)_2$, $Mg(FSI)_2$, $Mg(BETI)_2$, $Mg(DCMI)_2$, $Mg(FNF)_2$, $Mg(ClO_4)_2$, $Mg(SO_4)_2$, $Mg(NO_3)_2$, $Al(TFSI)_3$, $Al(TF)_3$, $Al(FSI)_3$, $Al(BETI)_3$, $Al(DCMI)_3$, $Al(FNF)_3$, $Al(ClO_4)_3$, $Al(SO_4)_3$, and $Al(NO_3)_3$.

In some embodiments, the metal salt is selected from the group consisting of LiTFSI, LiTF, NaTFSI, NaFSI, KTFSI, KBETI, and $Mg(TFSI)_2$.

In some embodiments, the solvent in the electrolyte comprises at least 99% water.

In some embodiments, water is the only solvent in the electrolyte.

In some embodiments, the molal concentration of the metal salt in the electrolyte is between about 15 and about 100.

In some embodiments, the solvent comprises at least one non-aqueous solvent.

In some embodiments, the weight ratio of the at least one non-aqueous solvent in the solvent is between about 1% and about 99%. In some embodiments, the weight ratio of the at least one non-aqueous solvent in the solvent is between about 10% and about 90%.

In some embodiments, the molal concentration of the metal salt in the electrolyte is between about 5 and about 100.

In some embodiments, the non-aqueous solvent is a molecular or ionic solvent.

In some embodiments, the non-aqueous solvent is a molecular solvent selected from the group consisting of an alcohol, a ketone, a carboxylic acid, an ester of a carboxylic acid, a carbonic acid, an ester of a carbonic acid, an amine, an amide, a nitrile, an inorganic acid, an ester of an inorganic acid, an ether, a sulfone, a sulfoxide, a sulfate, a phosphate ester, a hydrocarbon, or combinations thereof.

In some embodiments, the non-aqueous solvent is a molecular solvent selected from the group consisting of ethylene carbonate, fluoroethylene carbonate, propylene carbonate, γ-butyrolactone, and vinylene carbonate.

In some embodiments, the non-aqueous solvent is an ionic solvent.

In some embodiments, the ionic solvent comprises a cation selected from the group consisting of imidazolium, pyrrolidinium, pyridinium, phosphonium, ammonium, and sulfonium.

In some embodiments, the ionic solvent comprises an anion selected from the group consisting of alkylsulfate, tosylate, methanesulfonate, bis(trifluoromethylsulfonyl)imide (TFSI), tetrafluorophosphate ($BF_4$), hexafluorophosphate ($PF_6$), halide, triflate (TF), [fluoro(nonafluorobutane) sulfonyl]imide (FNF), chlorate ($ClO_4$), and sulfate ($SO_4$).

In some embodiments, the electrolyte comprises one non-aqueous solvent.

In some embodiments, the electrolyte comprises two non-aqueous solvents.

In some embodiments, the electrolyte comprises two non-aqueous solvents, wherein at least one non-aqueous solvent is ethylene carbonate or fluoroethylene carbonate.

In some embodiments, the weight ratio of the first non-aqueous solvent:second non-aqueous solvent is between about 1:1 and about 3:2.

In some embodiments, the weight ratio of the first non-aqueous solvent:second non-aqueous solvent is between about 9:1 and about 9.9:0.1.

In some embodiments, the electrochemical stability window is measured using cyclic voltammetry.

In some embodiments, the electrolyte has an electrochemical stability window of between about 2.3 V and about 5.0 V. In some embodiments, the electrolyte has an electrochemical stability window of between about 2.5 V and about 3.5 V.

In some embodiments, the metal salt is is selected from the group consisting of LiTFSI, NaTFSI, NaFSI, $Na(SO_3CF_3)$, KTFSI, and $Mg(TFSI)_2$, wherein the solvent comprises a non-aqueous solvent selected from the group consisting of ethylene carbonate, fluoroethylene carbonate, propylene carbonate, butyrolactone, and vinylene carbonate, and wherein the solvent comprises water at a weight ratio of between about 40% and about 100%.

In some embodiments, the metal salt is LiTFSI and water is the only solvent.

In some embodiments, the metal salt is LiTF and water is the only solvent.

In some embodiments, the electrolyte comprises:
(a) the metal salt LiTFSI and the non-aqueous solvent fluoroethylene carbonate, wherein the solvent comprises water at a weight ratio of 90%;
(b) the metal salt LiTFSI and the nonaqueous solvent ethylene carbonate, wherein the solvent comprises water at a weight ratio of 50%;
(c) the metal salt LiTFSI and the non-aqueous solvents ethylene carbonate and fluoroethylene carbonate, wherein the solvent comprises water at a weight ratio of 47.5%;
(d) the metal salt LiTFSI and the non-aqueous solvent polyethylene carbonate, wherein the solvent comprises water at a weight ratio of 50%;
(e) the metal salt LiTFSI and the non-aqueous solvents polyethylene carbonate and fluoroethylene carbonate, wherein the solvent comprises water at a weight ratio of 47.5%;
(f) the metal salt LiTFSI and the non-aqueous solvents γ-butyrolactone and fluoroethylene carbonate, wherein the solvent comprises water at a weight ratio of 47.5%;

(g) the metal salt LiTFSI and the non-aqueous solvent ethylene carbonate, wherein the solvent comprises water at a weight ratio of 80%;

(h) the metal salt LiTFSI and the non-aqueous solvents ethylene carbonate and fluoroethylene carbonate, wherein the solvent comprises water at a weight ratio of 72%; or (i) the metal salt LiTFSI and the non-aqueous solvents vinylene carbonate and fluoroethylene carbonate, wherein the solvent comprises water at a weight ratio of 87%.

In some embodiments, the metal salt is NaTFSI and water is the only solvent.

In some embodiments, the metal salt is NaFSI and water is the only solvent.

In some embodiments, the metal salt is $Na(SO_3CF_3)$ and water is the only solvent.

In some embodiments, the electrolyte comprises:

(a) the metal salt NaTFSI and the non-aqueous solvent ethylene carbonate, wherein the solvent comprises water at a weight ratio of 50%;

(b) the metal salt NaTFSI and the non-aqueous solvents ethylene carbonate and fluoroethylene carbonate, wherein the solvent comprises water at a weight ratio of 47.5%;

(c) the metal salt KTFSI and the non-aqueous solvent polyethylene carbonate, wherein the solvent comprises water at a weight ratio of 50%;

(d) the metal salt KBETI and the non-aqueous solvents polyethylene carbonate and fluoroethylene carbonate, wherein the solvent comprises water at a weight ratio of 47.5%;

(e) the metal salt $Mg(TFSI)_2$ and the non-aqueous solvents γ-butyrolactone and fluoroethylene carbonate, wherein the solvent comprises water at a weight ratio of 47.5%;

(f) the metal salt NaTFSI and the non-aqueous solvent ethylene carbonate, wherein the solvent comprises water at a weight ratio of 80%;

(g) the metal salt NaTFSI and the non-aqueous solvents ethylene carbonate and fluoroethylene carbonate, wherein the solvent comprises water at a weight ratio of 72%; or (h) the metal salt LiTFSI and the non-aqueous solvents vinylene carbonate and ethylene carbonate, wherein the solvent comprises water at a weight ratio of 87%.

The present invention also provides an electrochemical battery cell comprising an electrolyte.

In some embodiments, the electrochemical battery cell comprises a positive electrode and a negative electrode.

In some embodiments, the electrochemical battery cell comprises a negative electrode, wherein the negative electrode is selected from the group consisting of $LiCoO_2$, $LiNi_{0.33}Mn_{0.33}Co_{0.33}O_2$, $LiNi_{0.5}Mn_{1.5}O_2$, $LiCoPO_4$, and $LiNiPO_4$.

In some embodiments, the electrochemical battery cell comprises a positive electrode, wherein the positive electrode is selected from the group consisting of lithium, magnesium, aluminum, zinc, chromium, iron, nickel, tin, lead, hydrogen, copper, silver, palladium, mercury, platinum, gold, molybdenum, sulfur, combinations thereof, and oxides thereof.

In some embodiments, the electrochemical battery cell comprises a positive electrode, wherein the positive electrode is $Mo_6S_8$ and the negative electrode is $LiMn_2O_4$.

In some embodiments, the number of cycles at a C-rate of about 4.5 C is between about 10 and about 500 for the electrochemical battery cell. In some embodiments, the number of cycles at a C-rate of about 1.5 C is between about 500 and about 2000 for the electrochemical battery.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention. The following drawings are given by way of illustration only, and thus are not intended to limit the scope of the present invention.

DETAILED DESCRIPTION OF THE INVENTION

Figure 1:
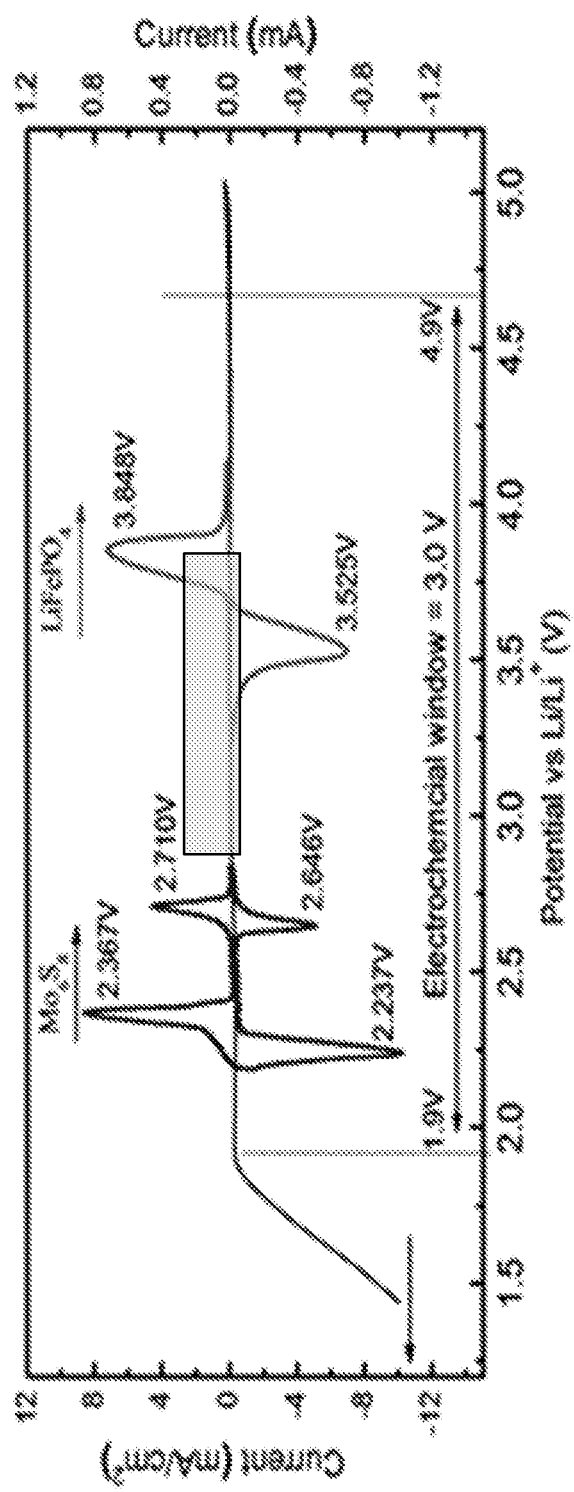
FIG. 1 shows a cyclic voltammogram (CV) of an aqueous electrolyte conducted on stainless steel electrodes using an electrolyte based on 21 m lithium bis(trifluoromethane sulfonyl)imide (LiTFSI) in $H_2O$. An Ag/AgCl reference electrode was used to calibrate and translate electrode potentials.

As used herein, the singular terms "a" and "the" are synonymous and used interchangeably with "one or more" and "at least one," unless the language and/or context clearly indicates otherwise. As used herein, the term "comprising" means including, made up of, and composed of.

All numbers in this description indicating amounts, ratios of materials, physical properties of materials, and/or use are to be understood as modified by the word "about," except as otherwise explicitly indicated. The term "about" as used herein includes the recited number ±10%. Thus, "about ten" means 9 to 11.

The term "aqueous electrolyte" as used herein, refers to an electrolyte composition that contains water as the only solvent.

The term "aqueous-based electrolyte" or "hybrid electrolyte" refers to an electrolyte composition that contains water and at least one non-aqueous solvent. In some embodiments, the content of water in the hybrid electrolyte is between 1% and 99%.

The term "non-aqueous electrolyte" refers to an electrolyte composition that contains aprotic or protic solvents in which the content of water is less than 1%.

The term "molecular compound" as used herein, refers to any compound that does not dissociate into ions under normal (ambient) conditions.

The term "ionic compound" as used herein, refers to any compound that dissociates into ions under normal (ambient) conditions.

The term "metal compound" as used herein, refers to any metal from the alkali metals (e.g., Li, Na), the alkali earth metals (e.g., Mg, Ca), the transition metals (e.g., Fe, Zn), or the post-transition metals (e.g., Al, Sn). In some embodiments, the metal compound is Li, Na, K, Mg, or Al.

The term "metal salt" as used herein, refers to any compound that can be dissociated by solvents into metal ions and corresponding anions.

The "molality" (m) of a solution is defined as the amount of substance (in moles) of solute, $n_{solute}$, divided by the mass (in kg) of the solvent, $min_{solvent}$.

$$molality = n_{solute}/m_{solvent}$$

The unit for molality (m) is moles per kilogram (mol/kg).

The term "solvent" as used herein, refers to water (aqueous), non-aqueous compounds, or combinations thereof, that can help metal salts dissociate into metal ions and corresponding anions.

The term "non-aqueous solvent" as used herein, refers to an solvent composition that contains molecular solvents, ionic solvents, or combinations thereof. A non-aqueous solvent does not contain water.

The present invention is directed to an electrolyte comprising:
  (a) at least one metal salt; and
  (b) a solvent comprising between about 1% and about 100% water by weight.

In some embodiments, the electrolyte comprises one, two, three, four, or five metal salts. In some embodiments, the electrolyte comprises between 1 and 5, 1 and 4, 1 and 3, 1 and 2, 2 and 5, 2 and 4, 2 and 3, 3 and 5, 3 and 4, or 4 and 5 metal salts. In some embodiments, the electrolyte comprises one metal salt.

In some embodiments, the metal salt comprises a metal ion and an anion. In some embodiments, the metal salt comprises a positive metal ion and a counter anion that are stable against hydrolysis. In some embodiments, the metal salt comprises a metal ion and a counter anion that are stable against electrochemical oxidation and reduction. In some embodiments, the metal salt comprises a metal ion and a counter ion that are passivated by electrochemical oxidation and reduction.

In some embodiments, the metal ion is selected from the group consisting of $Li^+$, $Na^+$, $K^+$, $Mg^{2+}$, and $Al^{3+}$. In some embodiments, the metal ion is $Li^+$. In some embodiments, the metal ion is $Na^+$. In some embodiments, the metal ion is $K^+$. In some embodiments, the metal ion is $Mg^{2+}$. In some embodiments, the metal ion is $Al^{3+}$.

In some embodiments, the metal salt that enables the formation of an aqueous SEI should not only be highly soluble and chemically stable in water, but also be susceptible to electrochemical reduction at a desired potential, i.e., a potential higher than that of $H_2$ evolution, producing a solid product insoluble in aqueous media. In some embodiments, the anion comprises fluoride that can become a part of the solid electrolyte interphase by electrochemical reduction or electrochemical oxidation. In some embodiments, the anion is a fluoroalkyl sulfonamide or a fluoroalkyl sulfonate.

In some embodiments, the anion is chemically stable against hydrolysis. As used herein, the term "chemically stable" means that the anion is thermodynamically stable, which occurs when a system is in its lowest energy state or is in chemical equilibrium with its environment.

In some embodiments, the anion is selected from the group consisting of bis(trifluoromethane sulfonyl)imide (TFSI), trifluoromethane sulfonate (TF), bis(fluorosulfonyl) imide (FSI), tetrafluorophosphate ($BF_4$), hexafluorophosphate ($PF_6$), bis(pentafluoroethane sulfonyl) imide (BETI), 4,5-dicyano-2-trifluoromethanoimidazole (DCMI), [fluoro (nonafluorobutane) sulfonyl]imide (FNF), perchlorate ($ClO_4$), sulfate ($SO_4$), and nitrate ($NO_3$).

In some embodiments, the metal salt is selected from the group consisting of LiTFSI, LiTF, LiFSI, LiBETI, LiDCMI, LiFNF, $LiClO_4$, $LiSO_4$, $LiNO_3$, NaTFSI, NaTF, NaFSI, NaBETI, NaDCMI, NaFNF, $NaClO_4$, $NaSO_4$, $NaNO_3$, KTFSI, KTF, KFSI, KBETI, KDCMI, KFNF, $KClO_4$, $KSO_4$, $KNO_3$, $Mg(TFSI)_2$, $Mg(TF)_2$, $Mg(FSI)_2$, $Mg(BETI)_2$, $Mg(DCMI)_2$, $Mg(FNF)_2$, $Mg(ClO_4)_2$, $Mg(SO_4)_2$, $Mg(NO_3)_2$, $Al(TFSI)_3$, $Al(TF)_3$, $Al(FSI)_3$, $Al(BETI)_3$, $Al(DCMI)_3$, $Al(FNF)_3$, $Al(ClO_4)_3$, $Al(SO_4)_3$, and $Al(NO_3)_3$. In some embodiments, the metal salt is selected from the group consisting of LiTFSI, LiTF, NaTFSI, NaTF, KTFSI, KBETI, and $Mg(TFSI)_2$.

In some embodiments, the electrolyte is an aqueous electrolyte. In some embodiments, the aqueous electrolyte comprises water as the only solvent. In some embodiments, the aqueous electrolyte comprises at least 99% water by weight.

In some embodiments, the metal salt is soluble in water.

In some embodiments, the molal concentration (mol/kg) of the metal salt in the aqueous electrolyte is between about 0.1 and about 100, about 0.1 and about 50, about 0.1 and about 25, about 0.1 and about 22, about 0.1 and about 21, about 0.1 and about 20, about 0.1 and about 15, about 0.1 and about 10, about 0.1 and about 5, about 0.1 and about 1, about 1 and about 100, about 1 and about 50, about 1 and about 25, about 1 and about 22, about 1 and about 21, about 1 and about 20, about 1 and about 15, about 1 and about 10, about 1 and about 5, about 5 and about 100, about 5 and about 50, about 5 and about 25, about 5 and about 22, about 5 and about 21, about 5 and about 20, about 5 and about 15, about 5 and about 10, about 10 and about 100, about 10 and about 50, about 10 and about 25, about 10 and about 22, about 10 and about 21, about 10 and about 20, about 10 and about 15, about 15 and about 100, about 15 and about 50, about 15 and about 25, about 15 and about 22, about 15 and about 21, about 15 and about 20, about 20 and about 100, about 20 and about 50, about 20 and about 25, about 20 and about 22, about 20 and about 21, about 21 and about 100, about 21 and about 50, about 21 and about 25, about 21 and about 22, about 22 and about 100, about 22 and about 50, about 22 and about 25, about 25 and about 100, about 25 and about 50, or about 50 and about 100. In some embodiments, the molal concentration of the metal salt in the aqueous electrolyte is between about 0.1 and about 25. In some embodiments the molal concentration of the metal salt in the aqueous solvent is between about 5 and 100.

In some embodiments, the at least one metal salt and water are combined at a temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 60° C. and about 100° C., about 60° C. and about 80° C., about 40° C. and about 60° C., about 60° C. and about 100° C., about 60° C. and about 80° C., or between about 80° C. and about 100° C. In some embodiments, the at least one metal salt is added to water at a temperature of between about 20° C. and about 40° C.

In some embodiments, after combining the at least one metal salt and water, the combination is mixed at a temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 40° C. and about 100° C., about 40° C. and about 80° C., about 40° C. and about 60° C., about 60° C. and about 100° C., about 60° C. and about 80° C., or between about 80° C. and about 100° C. In some embodiments, the at least one metal salt is added to water at a temperature of between about 40° C. and about 60° C.

In some embodiments, the aqueous electrolyte further comprises an additive, wherein the additive comprises less than 10% by weight of the aqueous electrolyte. In some embodiments, the aqueous electrolyte comprises by weight between about 0.1% and about 9.9%, about 0.1% and about 9%, about 0.1% and about 5%, about 0.1% and about 1%, about 1% and about 9.9%, about 1% and about 9%, about 1% and about 5%, about 5% and about 9.9%, about 5% and about 9%, or about 9% and about 9.9% of an additive. In some embodiments, the additive can be a molecular solvent or an ionic ingredient.

In some embodiments, the solvent further comprises at least one non-aqueous solvent.

In some embodiments, the present invention is directed to an electrolyte comprising:

(a) at least one metal salt; and
(b) a solvent comprising water and a non-aqueous solvent, wherein the weight ratio of the non-aqueous solvent to the solvent is between about 1% and 99%.

In some embodiments, the electrolyte is a hybrid electrolyte. In some embodiments, the hybrid electrolyte comprises water and at least one non-aqueous solvent. In some embodiments, the hybrid electrolyte comprises water and one, two, three, four, or five non-aqueous solvents. In some embodiments, the hybrid electrolyte comprises one non-aqueous solvent. In some embodiments, the hybrid electrolyte comprises two non-aqueous solvents.

In some embodiments, the non-aqueous solvent is a solvent that helps at least one metal salt dissociate. In some embodiments, the non-aqueous solvent may be added to at least one metal salt and water to affect dissolution. In some embodiments, water and the at least one non-aqueous solvent form a homogeneous mixture.

In some embodiments, where the non-aqueous solvent comprises less than 10% by weight of the solvent, the non-aqueous solvent is referred to as an "additive."

In some embodiments, the non-aqueous solvent is a molecular solvent or an ionic solvent.

In some embodiments, the molecular solvent is an organic solvent. In some embodiments, the organic solvent is selected from the group consisting of an alcohol, a ketone, a carboxylic acid, an ester of a carboxylic acid, a carbonic acid, an ester of a carbonic acid, an amine, an amide, a nitrile, an inorganic acid, an ester of an inorganic acid, an ether, a sulfone, a sulfoxide, a sulfate, a phosphate ester, a hydrocarbon, or combinations thereof.

In some embodiments, the molecular solvent is an ether. In some embodiments, the ether is selected from the group consisting of 2-methyltetrahydrofuran (2-MeTHF), tetrahydrofuran (THF), 4-methyldioxolane (4-MeDIOX), tetrahydropyran (THP), 1,3-dioxolane (DIOX)) glymes, 1,2-dimethoxyethane (DME/mono-glyme), di-glyme, tri-glyme, tetra-glyme, and higher glymes.

In some embodiments, the molecular solvent is a carbonate. In some embodiments, the carbonate is selected from the group consisting of a cyclic carbonate, propylene carbonate (PC), ethylene carbonate (EC), an acyclic carbonate, dimethyl carbonate (DMC), ethylmethyl carbonate (EMC), fluoroethylene carbonate (FEC), vinylene carbonate (VC), and diethyl carbonate (DEC).

In some embodiments, the molecular solvent is a formate. In some embodiments, the formate is methyl formate or γ-butyrolactone (GBL).

In some embodiments, the non-aqueous solvent has a donor number of between about 15 and about 60, between about 15 and about 40, or between about 18 and about 40. The donor number represents a measure of the donor properties of solvents and is defined as the numerical value of the heat of adduct formation between the donor molecule and the reference acceptor $SbCl_5$ in dilute 1,2-dicloroethane solution:

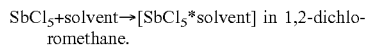

$SbCl_5$+solvent→[$SbCl_5$*solvent] in 1,2-dichloromethane.

In some embodiments, the non-aqueous solvent with a donor number between about 15 and about 60 is hexamethylphosphoramide, pyridine, N,N-diethylacetamide (DMAC), N,N-diethylformamide, dimethylsulfoxide (DMSO), tetramethylurea (TMU), N,N-dimethylacetamide, N,N-dimethylformamide (DMF), tributylphosphate, trimethylphosphate, N,N,N',N'-tetraethylsulfamide, tetraethylenediamine, tetramethylpropylenediamine, and pentamethyldiethylenetriamine. In some embodiments, the non-aqueous solvent is DMF.

In some embodiments, the non-aqueous solvent is an acceptor solvent, which can be characterized as Lewis acids (they may be protic or aprotic solvents) and promote solvation of anions.

In some embodiments, the non-aqueous solvent is molecular solvent, wherein the molecular solvent is an alcohol such as methanol; a glycol such as ethylene glycol; or a polyglycol such as polyethylene glycol. In some embodiments, the non-aqueous solvent is nitromethane, triflouroacetic acide, trifluoromethanesulfonic acid, sulfur dioxide, boron triflouride, or ethylene glycol (EG). In some embodiments, the non-aqueous solvent is a nitrile, such as acetonitrile (AN), a higher nitrile, propionitrile, succinonitrile, butyronitrile, and benzonitrile; an amide, such as formamide, N-methylformamide, N,N-dimethylformamide, N,N-diethylformamide, DMF, acetamide, N-methylacetamide, N,N-dimethylacetamide (DMAC), N,N-diethylacetamide, N,N,N'N'tetraethylsulfamide, tetramethylurea (TMU), 2-pyrrolidone, N-methylpyrrolidone, and N-methylpyrrolidinone; an amine, such as butylamine, ethylenediamine, triethylamine, pyridine, 1,1,3,3-tetramethylguanidine (TMG), tetraethylenediamine, tetramethylpropylenediamine, and pentamethyldiethylenetriamine; and organosulfur solvent, such as dimethylsulfoxide (DMSO), a sulfolane, a sulfones, a dimethylsulfite, an ethylene sulfite, or an organophosphorous solvents, such as tributylphosphate, trimethylphosphate, and hexamethylphosphoramide (HMPA).

In some embodiments, the non-aqueous solvent is an ionic solvent. In some embodiments, the ionic solvent is a room-temperature ionic liquid. In some embodiments, the ionic liquid comprises the cation imidazolium, pyrrolidinum, pyridininum, phosphonium, ammonium, or sulfonium. In some embodiments, the ionic liquid comprises the anion alkylsulfate, tosylate, methanesulfonate, bis(trifluoromethylsulfonyl)imide (TFSI), tetrafluorophosphate ($BF_4$), hexafluorophosphate ($PF_6$), halide, triflate (TF), [fluoro (nonafluorobutane) sulfonyl]imide (FNF), chlorate ($ClO_4$), or sulfate ($SO_4$).

In some embodiments, the ionic solvent is an imidazolium salt. In some embodiments, the imidazolium salt is selected from the group consisting of 1-ethyl-3-methylimidazolium chloride, 1-ethyl-3-methylimidazolium bromide, 1-ethyl-3-methylimidazolium iodide, 1-ethyl-3-methylimidazolium hexafluorophosphate, 1-ethyl-3-methylimidazolium tetrafluoroborate, 1-ethyl-3-methylimidazolium dicyanamide, 1-ethyl-3-methylimidazolium ethyl sulfate, 1-ethyl-3-methylimidazolium hydrogen sulfate, 1-ethyl-3-methylimidazolium trifluoro(trifluoromethyl)borate, 1-ethyl-3-methylimidazolium trifluoromethane sulfonate, 1-ethyl-3-methylimidazolium methane sulfonate, 1-butyl-3-methylimidazolium chloride, 1,3-dimethylimidazolium chloride dimethyl phosphate, 1-butyl-3-methylimidazolium bromide, 1-butyl-3-methylimidazolium chloride 1-butyl-3-methylimidazolium tetrafluoroborate, 1-butyl-3-methylimidazolium hexafluorophosphate, 1-butyl-3-methylimidazolium trifluoromethanesulfonate, 1-butyl-2,3-dimethylimidazolium chloride, 1-butyl-2,3-dimethylimidazolium hexafluorophosphate, 1-butyl-2,3-dimethylimidazolium tetrafluoroborate, 1-butyl-3-methylimidazolium bis(trifluoromethanesulfonyl)imide, 1-butyl-3-methylimidazolium tetrachloroferrate, 1-butyl-3-methylimidazolium iodide, 1-butyl-2,3-dimethylimidazolium bis(trifluoromethanesulfonyl)imide, 1-butyl-3-methylimidazolium trifluoro(trifluoromethyl)borate, 1-butyl-3-methylimidazolium tribromide, 1-butyl-3-methylimidazolium thiocyanate, 1-butyl-2,3-dimethylimidazolium trifluoromethanesulfonate, 1,3-dimethylimidazolium dimethyl phosphate, 1,3-dimethylimidazolium chloride, 1,2-dimethyl-3-propylimidazolium iodide, 2,3-dimethyl-1-propylimidazolium bis(trifluoromethanesulfonyl)imide, 1-decyl-3-methylimidazolium bis(trifluoromethanesulfonyl)imide, 1,3-dimethylimidazolium iodide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium trifluoromethanesulfonate, 1-hexyl-3-methylimidazolium bromide, 1-hexyl-2,3-dimethylimidazolium iodide, 1-hexyl-3-methylimidazolium bis(trifluoromethanesulfonyl)imide, 1-(2-hydroxyethyl)-3-methylimidazolium tetrafluoroborate, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-n-octylimidazolium trifluoromethanesulfonate, and 1-methyl-3-n-octylimidazolium tetrafluoroborate.

In some embodiments, the ionic solvent is a pyrrolidinium salt. In some embodiments, the ionic solvent is a pyrrolidinium salt selected from the group consisting of 1-butyl-1-methylpyrrolidinium bis(trifluoromethanesulfonyl)imide, 1-butyl-1-methylpyrrolidinium chloride, 1-butyl-1-methylpyrrolidinium bromide, 1-ethyl-1-methylpyrrolidinium tetrafluoroborate, 1-ethyl-1-methylpyrrolidinium bromide, and 1-methyl-1-propylpyrrolidinium bis(trifluoromethanesulfonyl)imide.

In some embodiments, the ionic solvent is a piperidinium salt. In some embodiments, the piperidinium salt is selected from the group consisting of 1-butyl-1-methylpiperidinium bromide, 1-butyl-1-methylpiperidinium bis(trifluoromethanesulfonyl)imide, and 1-methyl-1-propylpiperidinium bromide.

In some embodiments, the ionic solvent is a pyridinium salt. In some embodiments, the pyridinium salt is selected from the group consisting of 1-butylpyridinium chloride, 1-butylpyridinium bromide, 1-butylpyridinium hexafluorophosphate, 1-butyl-4-methylpyridinium bromide, 1-butyl-4-methylpyridinium hexafluorophosphate, 1-butyl-3-methylpyridinium bromide, 1-butylpyridinium tetrafluoroborate, 1-butyl-3-methylpyridinium chloride, 1-butyl-4-methylpyridinium chloride, 1-ethylpyridinium bromide, 1-ethylpyridinium chloride, 1-ethyl-3-methylpyridinium ethyl sulfate, 1-ethyl-3-(hydroxymethyl)pyridinium ethyl sulfate, 1-ethyl-3-methylpyridinium bis(trifluoromethanesulfonyl)imide, 1-hexylpyridinium hexafluorophosphate, and 1-propylpyridinium chloride.

In some embodiments, the ionic solvent is a morpholinium salt. In some embodiments, the morpholinium salt is 4-ethyl-4-methylmorpholinium bromide.

In some embodiments, the ionic solvent is an ammonium salt. In some embodiments, the ammonium salt is selected from the group consisting of amyltriethylammonium bis(trifluoromethanesulfonyl)imide, cyclohexyltrimethylammonium bis(trifluoromethanesulfonyl)imide, methyltri-n-octylammonium bis(trifluoromethanesulfonyl)imide, tetrabutylammonium bromide, tetrabutylammonium chloride, tetrabutylammonium iodide, tetrabutylammonium tetrafluoroborate, tetrahexylammonium iodide, tetraamylammonium iodide, tetra-n-octylammonium iodide, tetrabutylammonium hexafluorophosphate, tetraheptylammonium iodide, tetraamylammonium bromide, tetraamylammonium chloride, tetrabutylammonium trifluoromethanesulfonate, tetrahexylammonium bromide, tetraheptylammonium bromide, tetra-n-octylammonium bromide, tetrapropylammonium chloride, tributylmethylammonium bis(trifluoromethanesulfonyl)imide, tetrabutylammonium acetate, and trimethylpropylammonium bis(trifluoromethanesulfonyl)imide.

In some embodiments, the ionic solvent is a phosphonium salt. In some embodiments, the phosphonium salt is selected from the group consisting of tributylhexadecylphosphonium bromide, tributylmethylphosphonium iodide, tributyl-n-octylphosphonium bromide, tetrabutylphosphonium bromide, tetra-n-octylphosphonium bromide, tetrabutylphosphonium tetrafluoroborate, tetrabutylphosphonium hexafluorophosphate, tributyl(2-methoxyethyl)phosphonium bis(trifluoromethanesulfonyl)imide, and tributylmethylphosphonium bis(trifluoromethanesulfonyl)imide.

In some embodiments, the ionic solvent is a sulfonium salt. In some embodiments, the sulfonium salt is selected from the group consisting of trimethylsulfonium iodide, tributylsulfonium iodide, and triethylsulfonium bis(trifluoromethanesulfonyl)imide.

In some embodiments, the weight ratio of the at least one non-aqueous solvent in the solvent is between about 1% and about 99%, about 1% and about 90%, about 1% and about 80%, about 1% and about 70%, about 1% and about 60%, about 1% and about 50%, about 1% and about 40%, about 1% and about 30%, about 1% and about 20%, about 1% and about 10%, about 10% and about 99%, about 10% and about 90%, about 10% and about 80%, about 10% and about 70%, about 10% and about 60%, about 10% and about 50%, about 10% and about 40%, about 10% and about 30%, about 10% and about 20%, about 20% and about 99%, about 20% and about 90%, about 20% and about 80%, about 20% and about 70%, about 20% and about 60%, about 20% and about 50%, about 20% and about 40%, about 20% and about 30%, about 30% and about 99%, about 30% and about 90%, about 30% and about 80%, about 30% and about 70%, about 30% and about 60%, about 30% and about 50%, about 30% and about 40%, about 40% and about 99%, about 40% and about 90%, about 40% and about 80%, about 40% and about 70%, about 40% and about 60%, about 40% and about 50%, about 50% and about 99%, about 50% and about 90%, about 50% and about 80%, about 50% and about 70%, about 50% and about 60%, about 60% and about 99%, about 60% and about 90%, about 60% and about 80%, about 60% and about 70%, about 70% and about 99%, about 70% and about 90%, about 70% and about 80%, about 80% and about 99%, about 80% and about 90%, and about 90% and about 99%. In some embodiments, the weight ratio of the at least one non-aqueous solvent in the solvent is between about 10% to about 90%.

In some embodiments, the ratio (weight:weight) of the at least one non-aqueous solvent to water in the electrolyte is between about 1:1 and about 1:9, about 1:1 and about 1:4, about 1:1 and about 1:2, about 1:2 and about 1:9, about 1:2 and about 1:4, or about 1:4 and about 1:9. In some embodiments, the ratio (weight:weight) of the at least one non-aqueous solvent to water in the electrolyte is about 1:1, about 1:4, or about 1:9.

In some embodiments, the solvent comprises two non-aqueous solvents. In some embodiments, the ratio (weight:weight) of the first non-aqueous solvent:second non-aqueous solvent is between about 1:1 and about 3:2, about 1:1 and about 7:3, about 1:1 and about 4:1, about 1:1 and about 9:1, about 1:1 and about 9.5:0.5, about 1:1 and about 9.9:0.1, about 3:2 and about 7:3, about 3:2 and about 4:1, about 3:2 and about 9:1, about 3:2 and about 9.5:0.5, about 3:2 and about 9.9:0.1, about 7:3 and about 4:1, about 7:3 and about 9:1, about 7:3 and about 9.5:0.5, about 7:3 and about 9.9:0.1, about 4:1 and about 9:1, about 4:1 and about 9.5:0.5, about 4:1 and about 9.9:0.1, about 9:1 and about 9.5:0.5, about 9:1 and about 9.9:0.1, or about 9.5:0.5 and about 9.9:0.1.

In some embodiments, the at least one non-aqueous solvent and water form a homogeneous mixture. The term "homogeneous" as used herein, refers to a mixture which has uniform composition and properties throughout.

In some embodiments, the molal concentration of the metal salt in the hybrid electrolyte is between about 0.1 and about 100, about 0.1 and about 50, about 0.1 and about 25, about 0.1 and about 22, about 0.1 and about 21, about 0.1 and about 20, about 0.1 and about 15, about 0.1 and about 10, about 0.1 and about 5, about 0.1 and about 1, about 1 and about 100, about 1 and about 50, about 1 and about 25, about 1 and about 22, about 1 and about 21, about 1 and about 20, about 1 and about 15, about 1 and about 10, about 1 and about 5, about 5 and about 100, about 5 and about 50, about 5 and about 25, about 5 and about 22, about 5 and about 21, about 5 and about 20, about 5 and about 15, about 5 and about 10, about 10 and about 100, about 10 and about 50, about 10 and about 25, about 10 and about 22, about 10 and about 21, about 10 and about 20, about 10 and about 15, about 15 and about 100, about 15 and about 50, about 15 and about 25, about 15 and about 22, about 15 and about 21, about 15 and about 20, about 20 and about 100, about 20 and about 50, about 20 and about 25, about 20 and about 22, about 20 and about 21, about 21 and about 100, about 21 and about 50, about 21 and about 25, about 21 and about 22, about 22 and about 100, about 22 and about 50, about 22 and about 25, about 25 and about 100, about 25 and about 50, or about 50 and about 100. In some embodiments, the molal concentration of the metal salt in the aqueous electrolyte is between about 0.1 and about 25. In some embodiments, the molal concentration of the metal salt in the hybrid electrolyte is between about 0.1 and about 10. In some embodiments, the molal concentration of the metal salt in the hybrid electrolyte is between about 1 and about 100.

In some embodiments, the at least one metal salt, water, and at least one non-aqueous solvent are combined at a temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 40° C. and about 100° C., about 40° C. and about 80° C., about 40° C. and about 60° C., about 60° C. and about 100° C., about 60° C. and about 80° C., or between about 80° C. and about 100° C. In some embodiments, the at least one metal salt is added to water at a temperature of between about 20° C. and about 40° C.

In some embodiments, after combining the at least one metal salt, water, and at least one non-aqueous solvent, the combination is mixed at the temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 40° C. and about 100° C., about 40° C. and about 80° C., about 40° C. and about 60° C., about 60° C. and about 100° C., about 60° C. and about 80° C., or between about 80° C. and about 100° C. In some embodiments, the at least one metal salt is added to water at a temperature of between about 40° C. and about 60° C.

In some embodiments, the pH of the hybrid electrolyte solution is between 7 and 11. In some embodiments, the pH of the hybrid electrolyte solution is between 5 and 14, 5 and 13, 5 and 12, 5 and 11, 5 and 10, 5 and 9, 5 and 8, 6 and 14, 6 and 13, 6 and 12, 6 and 11, 6 and 10, 6 and 9, 6 and 8, 7 and 14, 7 and 13, 7 and 12, 7 and 11, 7 and 10, 7 and 9, 7 and 8, 8 and 14, 8 and 13, 8 and 12, 8 and 11, 8 and 10, or 8 and 9. In some embodiments, the pH can be tailored using pH adjusting additives including basic salts, acidic salts, and buffering agents.

Properties of the Aqueous and Hybrid Electrolytes

The electrochemical stability window of a substance is the voltage range at which the substance is neither oxidized or reduced. The electrochemical stability window is calculated by subtracting the reduction potential (cathodic limit) from the oxidation potential (anodic limit).

Pure water has an electrochemical stability window of 1.23 V.

The electrochemical stability window for the aqueous and hybrid electrolytes can be evaluated using cyclic voltammetry (CV).

In some embodiments, the aqueous and hybrid electrolytes have an electrochemical stability window of between about 1.5 V and about 5.0 V, about 1.5 V and about 4.5 V, about 1.5 V and about 4.0 V, about 1.5 V and about 3.5 V, about 1.5 V and about 3.0 V, about 1.5 V and about 2.5 V, about 1.5 V and about 2.3 V, about 1.5 V and about 2.0 V, about 2.0 V and about 5.0 V, about 2.0 V and about 4.5 V, about 2.0 V and about 4.0 V, about 2.0 V and about 3.5 V, about 2.0 V and about 3.0 V, about 2.0 V and about 2.5 V, about 2.3 V and about 5.0 V, about 2.3 V and about 4.5 V, about 2.3 V and about 4.0 V, about 2.3 V and about 3.5 V, about 2.3 V and about 3.0 V, about 2.3 V and about 2.5 V, about 2.5 V and about 5.0 V, about 2.5 V and about 4.5 V, about 2.5 V and about 4.0 V, about 2.5 V and about 3.5 V, about 2.5 V and about 3.0 V, about 3.0 V and about 5.0 V, about 3.0 V and about 4.5 V, about 3.0 V and about 4.0 V, about 3.0 V and about 3.5 V, about 3.5 V and about 5.0 V, about 3.5 V and about 4.5 V, about 4.0 V and about 5.0 V, about 4.0 and about 5.5 V, or about 4.5 V and 5.5 V. In some embodiments, the aqueous and hybrid electrolytes have an electrochemical stability window of between about 2.5 V and about 3.5 V.

Figure 10:
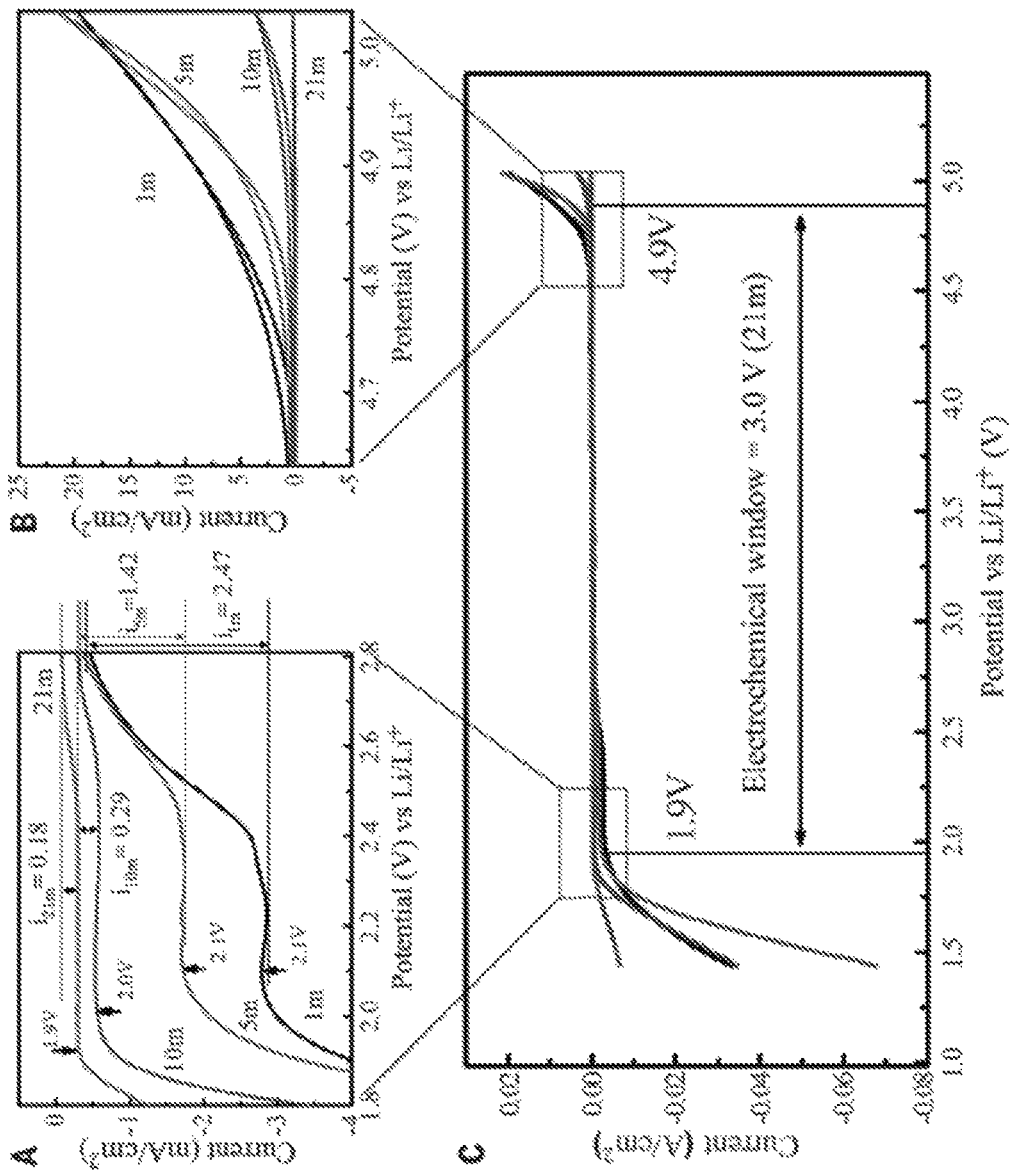
FIG. 10 shows as cyclic voltammogram of an aqueous electrolyte on non-active stainless steel electrodes at different concentrations (molality) between −1.8 V and 1.8 V versus Ag/AgCl at 10 mV/s, wherein the potential has been converted to a Li reference for convenience. (A) and (B) of FIG. 10 show zoomed-in regions near the anodic and cathodic extremes.

The electrochemical stability window for the aqueous LiTFSI electrolytes of the invention was evaluated with CV on stainless steel electrodes, whose first cathodic and anodic scans are shown in FIG. 10. The overall stability window expands as the LiTFSI concentration increases, with both oxygen and hydrogen evolution potentials pushed well beyond the thermodynamic stability limits of water. Upon closer examination of (A) in FIG. 10, the onset of reduction at all concentrations occurs at ~2.80 V, which rapidly accelerates at 2.63 V and then reaches a plateau. Quantum chemistry calculations predict the onset of LiTFSI-reduction at such high concentrations around 2.7-2.9 V, which is slightly higher than hydrogen evolution process (2.63 V) corresponding to the exponential current increase. Thus, prior to hydrogen evolution, the reduction of TFSI seems to result in a passivation process that intensifies with salt concentration, and reduces the plateau current by more than an order of magnitude, from 2.47 mA/cm$^2$ (1 m) to 0.18 mA/cm$^2$ (21 m). This passivation eventually suppresses hydrogen evolution, pushing its onset from 2.63 V to 1.90 V. On the cathode side ((B) of FIG. 10), the oxygen evolution also seems to be suppressed with increasing salt concentration, but without a clear passivation process, probably due to both the reduced water activity when coordinated to Li$^+$ at high concentration and an inner-Helmhotz layer increasingly populated by TFSI anions. McOwen, D. W. et al., *Energ. Environ. Sci.* 7:416-426 (2014). Overall, a stability window of ~3.0 V is achieved due to the extra-high concentration of LiTFSI ((C) of FIG. 10), with both cathodic (~1.9 V vs. Li) and anodic (~4.9 V vs. Li) limits beyond those defined by the Pourbaix-diagram of water at pH=7 (cathodic~2.63 V vs. Li, and anodic ~3.86 V vs. Li).

Figure 11:
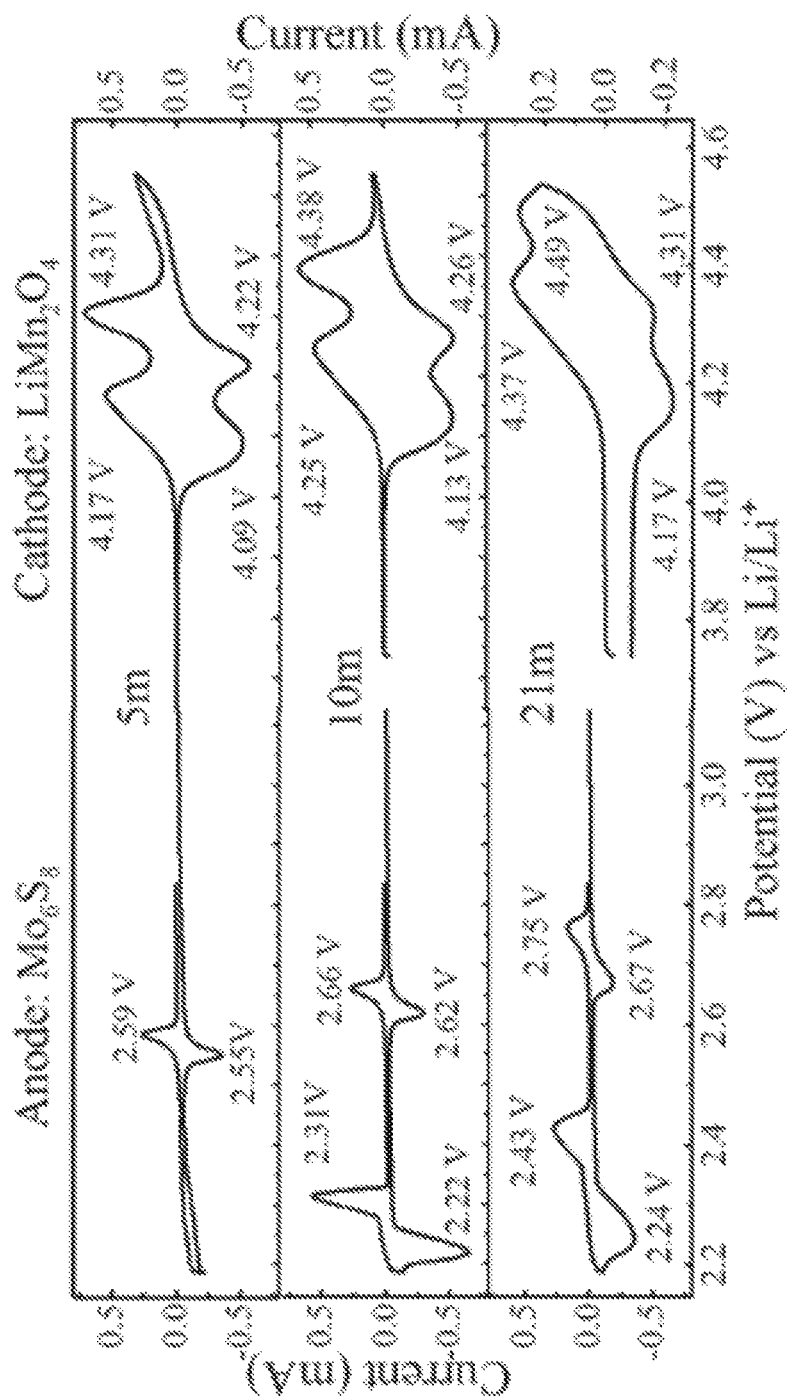
FIG. 11 shows cyclic voltammograms at various LiTFSI concentrations on active ($LiMn_2O_4$ and $Mo_6Ss$) electrode surfaces at 0.1 mV/s. Data was collected using a three-electrode device including $LiMn_2O_4$ and $Mo_6S_8$ as working electrodes and Ag/AgCl as a reference electrode.
Figure 12:
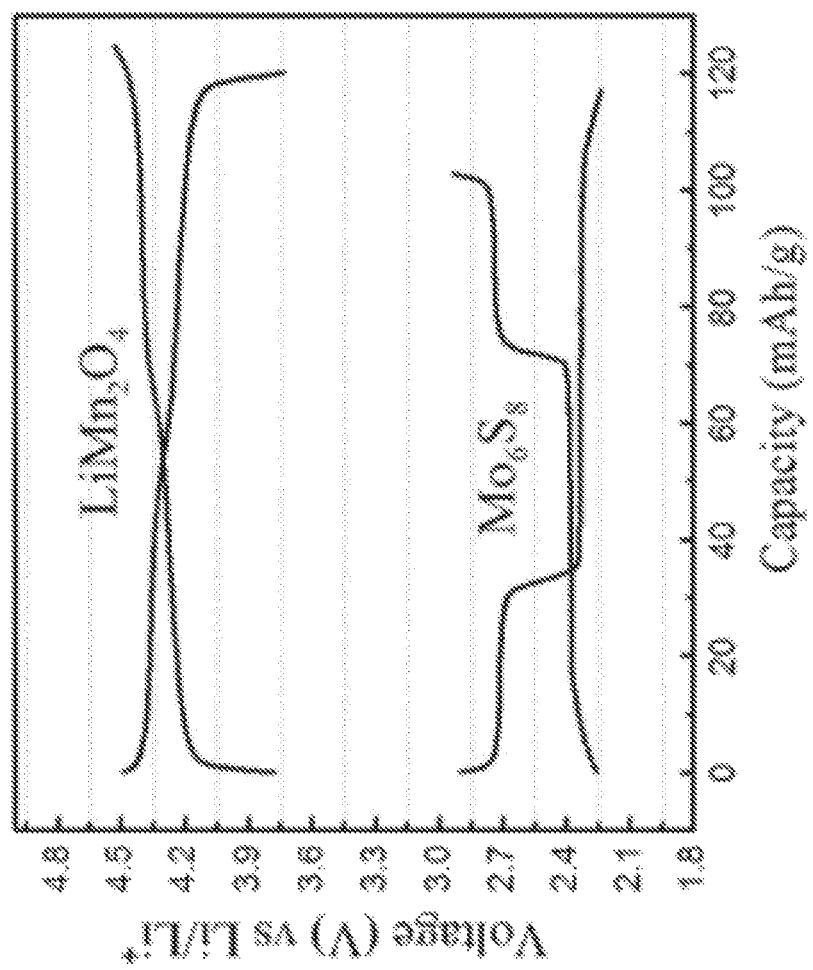
FIG. 12 is a graph of the typical voltage profile of $LiMn_2O_4$ and $Mo_6S_8$ electrodes in 21 m LiTFSI solution at a constant current. Data was collected using Ag/AgCl as a reference electrode.

Model cathode and anode materials LiMn$_2$O$_4$ and Mo$_6$S$_8$ were chosen as active working electrodes in CV experiments to verify the expanded stability window. FIG. 11 demonstrates two redox couples of LiMn$_2$O$_4$, which gradually shift from 4.09/4.17 V and 4.22/4.3 1 V in 5 m solution to 4.17/4.37 V and 4.31/4.49 V in 21 m solution, while the reaction kinetics become slower at high salt concentrations. For Mo$_6$Sg, a single lithiation/delithiation process was observed at ~2.5 V in dilute solutions, and only when salt concentrations reached 10 m or above did the second lithiation/delithiation at ~2.3 V appear. The modulation of redox processes toward positive potentials, observed in all cases in FIG. 11A, is attributed to the Li$^+$-activity change in the solution according to the Nernst equation. It is this modulation that moves the second redox process of Mo$_6$S$_8$ into the expanded electrochemical stability window of the aqueous electrolyte, allowing the full and reversible utilization of its Li storage sites otherwise inaccessible in diluted aqueous solutions (FIG. 15). Hence, a 2.3 V aqueous LiMn$_2$O$_4$/Mo$_6$S$_8$ full Li-ion cell is enabled by the aqueous electrolyte FIG. 12). In control electrolytes using LiNO$_3$ and LiSO$_4$ (FIGS. 13 and 14), similar positive modulations of Mo$_6$S$_8$ were observed; however, their limited solubility prohibited the appearance of the second lithiation/delithiation process. Even at the highest possible LiNO$_3$ concentration (12.5 m), hydrogen evolution still overwhelms the second lithiation of $Mo_6S_8$ at ~2.5 V vs. Li (FIG. 13), without any sign of passivation. Thus, the high concentration of LiTFSI in water not only reduces water activity and modulates redox potentials, but more importantly, suppresses the hydrogen evolution through formation of an interphase.

Electrochemical Devices

In some embodiments, the aqueous and hybrid electrolyte can be used to fabricate electrochemical devices. In some embodiments, the electrochemical device is: (1) a cyclic voltammogram test cell using stainless steel as working and counter electrodes and Ag/AgCl as reference electrode; (2) a cyclic voltammogram test cell using various anode and cathode materials as working electrodes, stainless steel as counter electrodes, and Ag/AgCl as reference electrode; or (3) a full metal ion cell that uses various intercalation anode and cathode materials.

In some embodiments, the aqueous and hybrid electrolytes can be used in diversified battery chemistries, such as Li-ion chemistries of high voltage and high capacity. In some embodiments, the aqueous and hybrid electrolytes can be used in beyond Li-ion chemistries such as Li/oxygen, sulfur-based cathode materials and intercalation- or conversion-reaction type materials that include sodium, magnesium, or calcium as energy storage species.

In some embodiments, the aqueous and hybrid electrolytes are used to prepare an electrochemical cell. In some embodiments, the electrochemical cell comprises an anode and a cathode. In some embodiments, the electrochemical cell comprises an anode, a cathode, and a separator. In some embodiments, the electrochemical cell is a battery.

In some embodiments, the anode (positive electrode) of the electrochemical cell used with the aqueous or hybrid electrolyte is selected from the group consisting of metals such as lithium, magnesium, aluminum, zinc, chromium, iron, nickel, tin, lead, copper, silver, palladium, mercury, platinum, gold, and combinations thereof; metal alloys; metal oxides; carbonaceous of varying degrees of graphitization; phosphates; and sulfides.

In some embodiments, the cathode (negative electrode) of the electrochemical cell used with the aqueous or hybrid electrolyte is selected from the group consisting of ferrate, iron oxide, cuprous oxide, iodate, cupric oxide, mercuric oxide, cobaltic oxide, manganese dioxide, lead oxide, oxygen, nickel oxyhydroxide, nickel dioxide, silver peroxide, permanganate, and bromate. In some embodiments, the cathode is selected from the group consisting of $LiCoO_2$, $LiNi_{0.33}Mn_{0.33}Co_{0.33}O_2$, $LiNi_{0.5}Mn_{1.5}O_2$, $LiCoPO_4$, $LiNiPO_4$, metal oxides, phosphates, conversion-reaction materials based on metal oxides, metal halides, and metal sulfides.

In some embodiments, the electrochemical cell includes a separator between the positive electrode and the negative electrode. In some embodiments, the separator is subjected to hydrophilic treatment or perforated such that the separator can be permeated with an aqueous electrolyte solution, allowing ions to pass through the separator. The separator may be any separator that is commonly used in batteries. Examples of the separator include polymer nonwoven fabrics, such as polypropylene nonwoven fabric and poly (phenylene sulfide) nonwoven fabric, and macroporous membranes of olefin resins, such as polyethylene and polypropylene. These can be used alone or in combination.

In some embodiments, electrochemical devices that operate using aqueous and hybrid electrolytes at high cell voltages are fabricated using techniques known to those of ordinary skill in the art.

In some embodiments, electrochemical devices prepared using aqueous and hybrid electrolytes of the invention have improved properties.

In some embodiments, battery performance can be quantified with four parameters: cell voltage, capacity, Coulombic efficiency, and cycling stability. While the first two determine the energy density, the latter two dictate the life and energy efficiency.

The "cycle life" of a battery is the number of complete charge/discharge cycles that the battery is able to support before its capacity falls under 80% of its original capacity. The "C-rate" of a battery is a measure of the rate at which a battery is being discharged. A C-rate of 1 C is a one-hour discharge, a C-rate of 0.5 C is a two-hour discharge, and a C-rate of 0.2 C is a five-hour discharge.

In some embodiments, the number of cycles for the battery at a high C-rate of about 4.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 4.5 C is between about 10 and about 500.

The "capacity retention" of a battery is a measurement of the fraction of full capacity available from a battery under a specified set of conditions, after the battery has been stored for a given amount of time.

In some embodiments, the capacity retention (in mAh/g) for a battery at a high C-rate of about 4.5 C is between about 30% and about 90%, about 30% and about 80%, about 30% and about 70%, about 30% and about 60%, about 60% and about 90%, about 60% and about 80%, about 60% and about 70%, about 70% and about 90%, about 70% and about 80%, or about 80% and about 90%. In some embodiments, the capacity retention (in mAh/g) for a battery at a high C-rate of about 4.5 C is between about 60% and about 80%.

In some embodiments, the number of cycles for the battery at a low C-rate of about 0.15 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 1.5 C is between about 500 and about 2000.

In some embodiments, the capacity retention (in mAh/g) for a battery at a low C-rate of about 0.15 C is between about 30% and about 90%, about 30% and about 80%, about 30% and about 70%, about 30% and about 60%, about 60% and about 90%, about 60% and about 80%, about 60% and about 70%, about 70% and about 90%, about 70% and about 80%, or about 80% and about 90%. In some embodiments, the capacity retention (in mAh/g) for a battery at a low C-rate of about 0.15 C is between about 70% and about 90%.

In some embodiments, the electrochemical cell operates at a temperature of less than about 100° C., about 90° C., about 80° C., about 70° C., about 60° C., about 50° C., about 40° C., about 30° C., about 20° C., or about 10° C. In some embodiments, the electrochemical cell operates at a temperature between about −40° C. and about 100° C., about −40° C. and about 90° C., about −40° C. and about 80° C., about −40° C. and about 70° C., about −40° C. and about 60° C., about −40° C. and about 50° C., about −40° C. and about 40° C., about −40° C. and about 30° C., about −30° C. and about 100° C., about −30° C. and about 90° C., about −30° C. and about 80° C., about −30° C. and about 70° C., about −30° C. and about 60° C., about −30° C. and about 50° C., about −30° C. and about 40° C., about −30° C. and about 30° C., about −20° C. and about 100° C., about −20° C. and about 90° C., about −20° C. and about 80° C., about −20° C. and about 70° C., about −20° C. and about 60° C., about −20° C. and about 50° C., about −20° C. and about 40° C., or about −20° C. and about 30° C.

In some embodiments, the electrochemical cell has a fuel cell output voltage greater than 1.5 V, 1.6 V, 1.7 V, 1.8 V, 1.9 V, or 2.0 V. In some embodiments, the electrochemical cell has a fuel cell output voltage between 1.0 V and 4.0 V, 1.0 V and 3.5 V, 1.0 V and 3.0 V, 1.0 V and 2.5 V, 1.0 V and 2.0 V, 1.0 V and 1.5 V, 1.5 V and 4.0 V, 1.5 V and 3.5 V, 1.5 V and 3.0 V, 1.5 V and 2.5 V, 1.5 V and 2.0 V, 2.0 V and 4.0 V, 2.0 V and 3.5 V, 2.0 V and 3.0 V, 2.0 V and 2.5 V, 2.5 V and 4.0 V, 2.5 V and 3.5 V, or 2.5 V and 3.0 V.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Experimental Details

Lithium bis(trifluoromethane sulfonyl) imide (LiTFSI) (>98%) and water (HPLC grade) were purchased from Tokyo Chemical Industry and Sigma-Aldrich, respectively. Aqueous electrolytes were prepared by molality (mol of salt in kg of solvent), which were coded by abbreviated concentrations (1 m, 5 m, 10 m, 15 m, 20 m, 21 m, and 22 m) with LiTFSI molar fractions for these concentrations being 0.0177 (1 m), 0.0826 (5 m), 0.1526 (10 m), 0.2647 (20 m), 0.2743 (21 m), and 0.2836 (22 m).

Chevrel phase $Mo_6S_8$ was prepared by leaching Cu from copper chevrel powder $Cu_2Mo_6S_8$ synthesized by the following solid-state synthesis method. First, $Cu_2Mo_6S_8$ precursors, CuS (99% from Sigma-Aldrich), Mo (99.99% from Sigma-Aldrich), and $MoS_2$ (99% from Sigma-Aldrich) were ground by ball-milling for 0.5 hours, then the powdery mixture was pelleted under $10^6$ Pa and sealed in a Swagelok stainless steel tube, which was gradually heated to 900° C. for 24 hours at 20 C/minute in argon. The products were stirred in a 6 M HCl solution for 12 hours to extract Cu. Finally, the obtained powder (chevrel $Mo_6Ss$) was washed with deionized water multiple times followed by drying at 1000 C overnight under vacuum.

The cathode materials, $LiMn_2O_4$ and $LiN_{0.8}Co_{0.15}Al_{0.05}O_2$, were received from MTI Corporation without further purification.

The viscosity (η) of the electrodes was measured on a TA Viscometer AR 2000 at 250 C with a parallel plate of 40 mm diameter and a 2° C. cone.

The oxygen solubility in aqueous electrodes was measured using a YSI Pro2030 Dissolved Oxygen & Conductivity Meter with a 2003 polarographic DO sensor.

The ionic conductivity was measured with electrochemical impedance spectroscopy (EIS) using a Solartron 1260 equipped with a 1287 Electrochemical Interface (Solatron Metrology, UK) over a temperature range of 10 to 500 C. The samples were equilibrated in a thermostated water-bath, and at each set temperature the sample was left standing for at least 1 hour before an EIS was collected. The conductivity cell constants were pre-determined using 0.01 M aqueous KCl standard solution at 250 C. Composite electrodes were fabricated by compressing active materials, carbon black, and poly(vinylidene difluoride) (PTFE) at a weight ratio of 8:1:1 on a stainless steel grid. The three-electrode devices for the cathode consisted of $LiMn_2O_4$ composite (about 2 mg) as working, carbon black (about 20 mg) as the counter, and Ag/AgCl as the reference electrode, respectively; and the anode three-electrode devices consisted of $Mo_6S_8$ composition (about 1.5 mg) as working, 2 mm platinum disc as counter, and Ag/AgCl as reference electrode, respectively.

Cyclic voltammetry (CV) was carried out using CHI 600E electrochemical work station at a scanning rate of 0.1 mV/s for these composite working electrodes. CV was also applied to determine the electrochemical stability window at 10 mV/s using 316 stainless steel grid (200-mesh sieve) as both working and counter electrodes, which were thoroughly cleaned ultrasonically in high purity alcohol, and then washed three times with high purity water and dried before measurements were taken. The full ALIB cell was assembled in a CR2032-type coin cell using either $LiMn_2O_4$ or $LiN_{0.8}Co_{0.15}Al_{0.05}O_2$ cathode (about 20~10 mg/cm$^2$), $Mo_6S_8$ anode (about 10 mg/cm$^2$) and glass fiber as separator. The cells were cycled galvanostatically on a Land BT2000 battery test system (Wuhan, China) at room temperature.

Example 1

Formulating Super-Concentrated Aqueous Electrolytes

To a vial containing 6.03 g (21.0 mmol) LiTFSI, 1.0 mL (1.0 g, 55 mmol) of distilled water was added. The mixture was stirred and heated to 50° C. before a homogenous solution was obtained. A similar procedure was followed when LiTF was used as the lithium salt.

Example 2

Formulating Super-Concentrated Hybrid Electrolytes

To a vial containing 1.44 g (5.0 mmol) of LiTFSI, 0.5 mL (0.5 g, 28 mmol) of distilled water and 0.5 mL (0.66 g, 7.5 mmol) of EC were added. The mixture was stirred and heated to 50° C. before a homogenous solution was obtained. A similar procedure was followed when LiTF was used as the lithium salt.

Example 3

Formulating Super-Concentrated Hybrid Electrolytes with Additive

To a vial containing 1.44 g (5.0 mmol) LiTFSI, 0.5 mL (0.5 g, 28 mmol) of distilled water, 0.5 mL of EC (0.66 g, 7.5 mmol), and 0.12 g (113 mmol) of FEC were added. The mixture was stirred and heated up at 50° C. before a homogenous solution is obtained. A similar procedure was followed when LiTF was used as the lithium salt.

Table 1 lists additional lithium electrolyte solutions prepared using a similar procedure.

TABLE 1

Lithium Electrolyte Formulations

| Salt Concentration (m) | Solvent Ratio (by weight) | Additional Solvent Concentration (by weight) |
|---|---|---|
| LiTFSI 21.0 m | water | |
| LiTF 21.0 m | water | |
| LiTFSI 21.0 m | water | FEC (10%) |
| LiTFSI 5.0 m | EC/water (50:50) | |
| LiTFSI 5.0 m | EC/water (50:50) | FEC (5%) |
| LiTFSI 5.0 m | PC/water (50:50) | |
| LiTFSI 5.0 m | PC/water (50:50) | FEC (5%) |
| LiTFSI 5.0 m | GBL/water (50:50) | FEC (5%) |
| LiTFSI 15.0 m | EC/water (20:80) | |
| LiTFSI 15.0 m | EC/water (20:80) | FEC (10%) |
| LiTFSI 15.0 m | VC/water (10:90) | FEC (3%) |

Example 4

Cyclic Voltammogram of Aqueous and Hybrid Electrolytes on Stainless Steel Electrodes Using a three electrode configuration, a 316 stainless steel working electrode was polarized anodically or cathodically in 21 m LiTFSI/$H_2O$ at a scan rate of 10 mV/s against an Ag/AgCl reference electrode to +1.80 V and −1.80 V, respectively. FIG. 1 shows the full electrochemical stability window of this aqueous electrolyte. For convenience of viewing, the potential coordinates in FIG. 1 was translated into one against a $Li^+/Li$ reference electrode.

Example 5

Cyclic Voltammogram of Hybrid Electrolyte on Stainless Steel Electrodes

Figure 2:
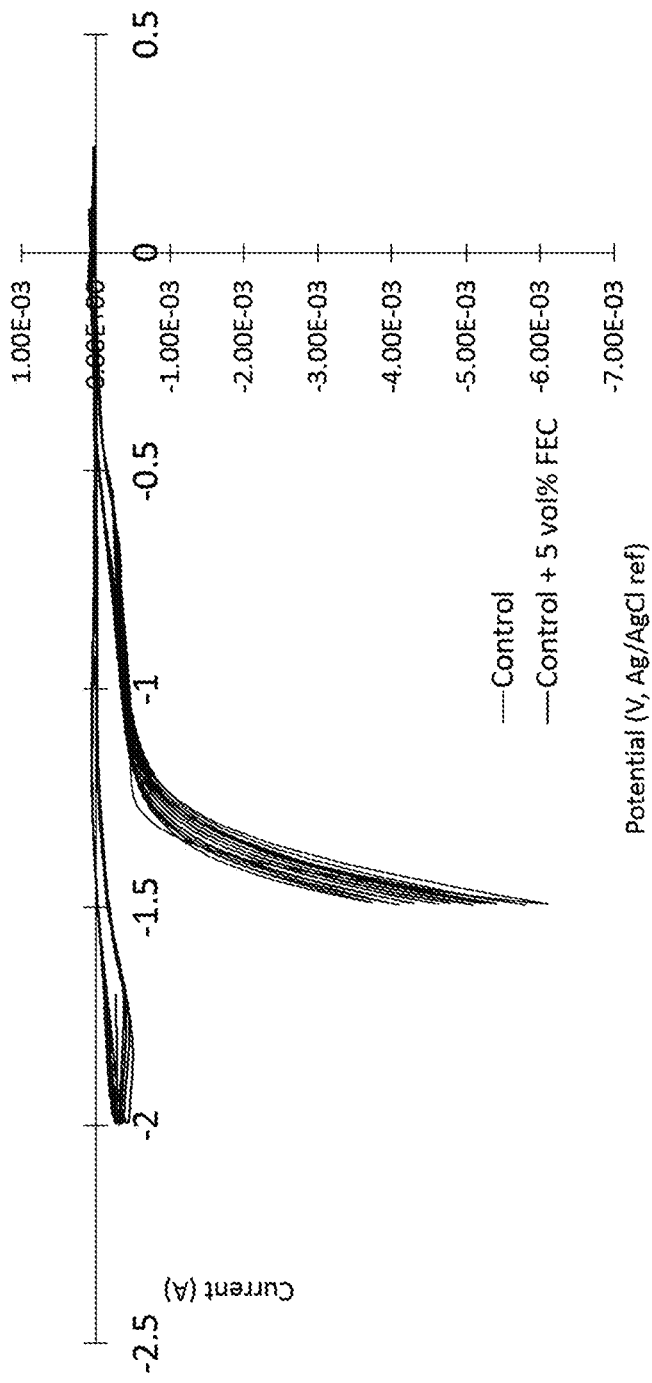
FIG. 2 shows a cyclic voltammogram of a hybrid electrolyte conducted on stainless steel electrodes using an electrolyte based on 5 m LiTFSI in $EC/H_2O$ (5:5) with or without 5% fluoroethylene carbonate (FEC). An Ag/AgCl reference electrode was used to calibrate the electrode potentials.

Using a three electrode configuration, a 316 stainless steel working electrode was polarized anodically or cathodically in 5 m LiTFSI/$H_2O$/EC (50:50 $H_2O$:EC) with 5% FEC at a scan rate of 10 mV/s against an Ag/AgCl reference electrode to +1.80 V and −1.80 V, respectively. FIG. 2 shows the full electrochemical stability window of this aqueous electrolyte. For convenience of viewing, the potential coordinates in FIG. 2 was translated into one against $Li^+/Li$ reference electrode.

Example 6

Cyclic Voltammogram of Aqueous Electrolyte on Active Electrodes

Figure 3:
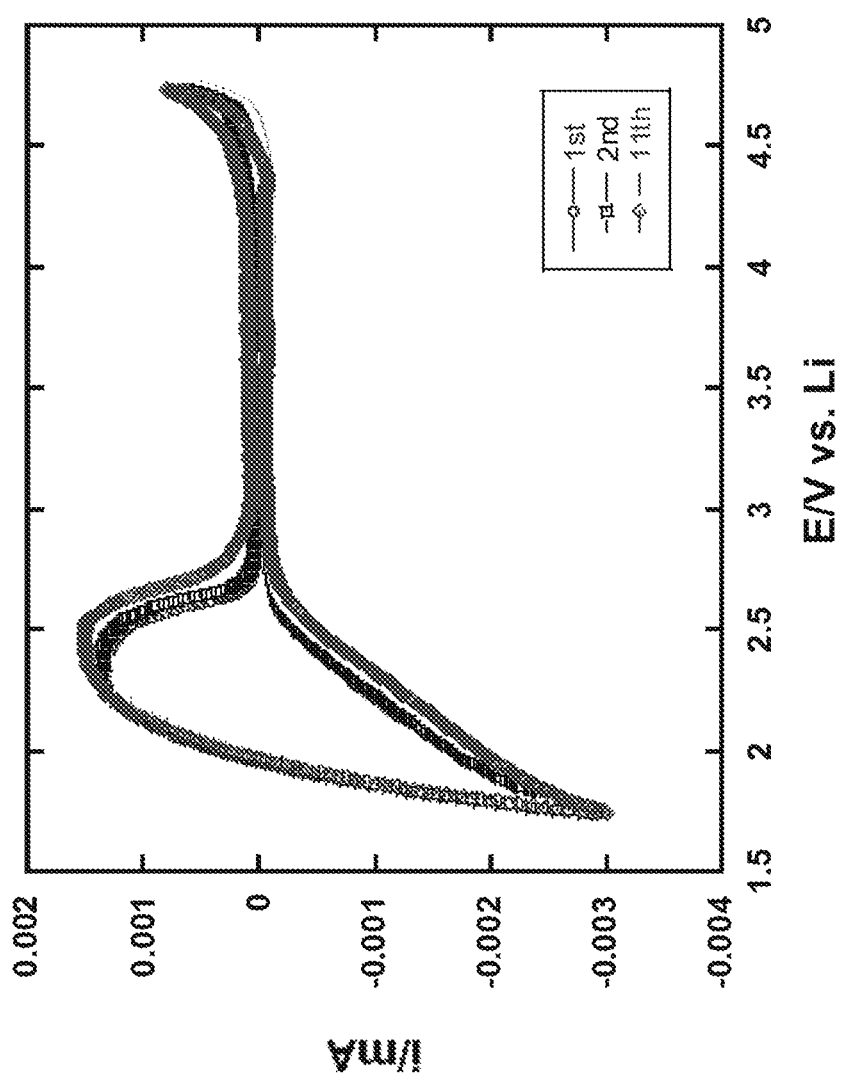
FIG. 3 shows the cyclic voltammogram of a hybrid electrolyte conducted on $L_4Ti_5O_{12}$ active electrodes using an electrolyte based on 5 m LiTFSI in $EC/H_2O$ (5:5) with or without 5% FEC. An Ag/AgCl reference electrode was used to calibrate and translate electrode potentials.

Using a three electrode configuration, a $LiMn_2O_4$ or $Mo_6S_8$ working electrode was polarized anodically or cathodically in 21 m LiTFSI/$H_2O$ at a scan rate of 0.10 mV/s against an Ag/AgCl reference electrode to +1.80 V and −1.80 V, respectively. FIG. 3 shows the full electrochemical stability window of this aqueous electrolyte. For convenience of viewing, the potential coordinates in FIG. 3 was translated into one against $Li^+/Li$ reference electrode.

Example 7

Assembly and Cycling of Full Li-Ion Cells

Figure 4:
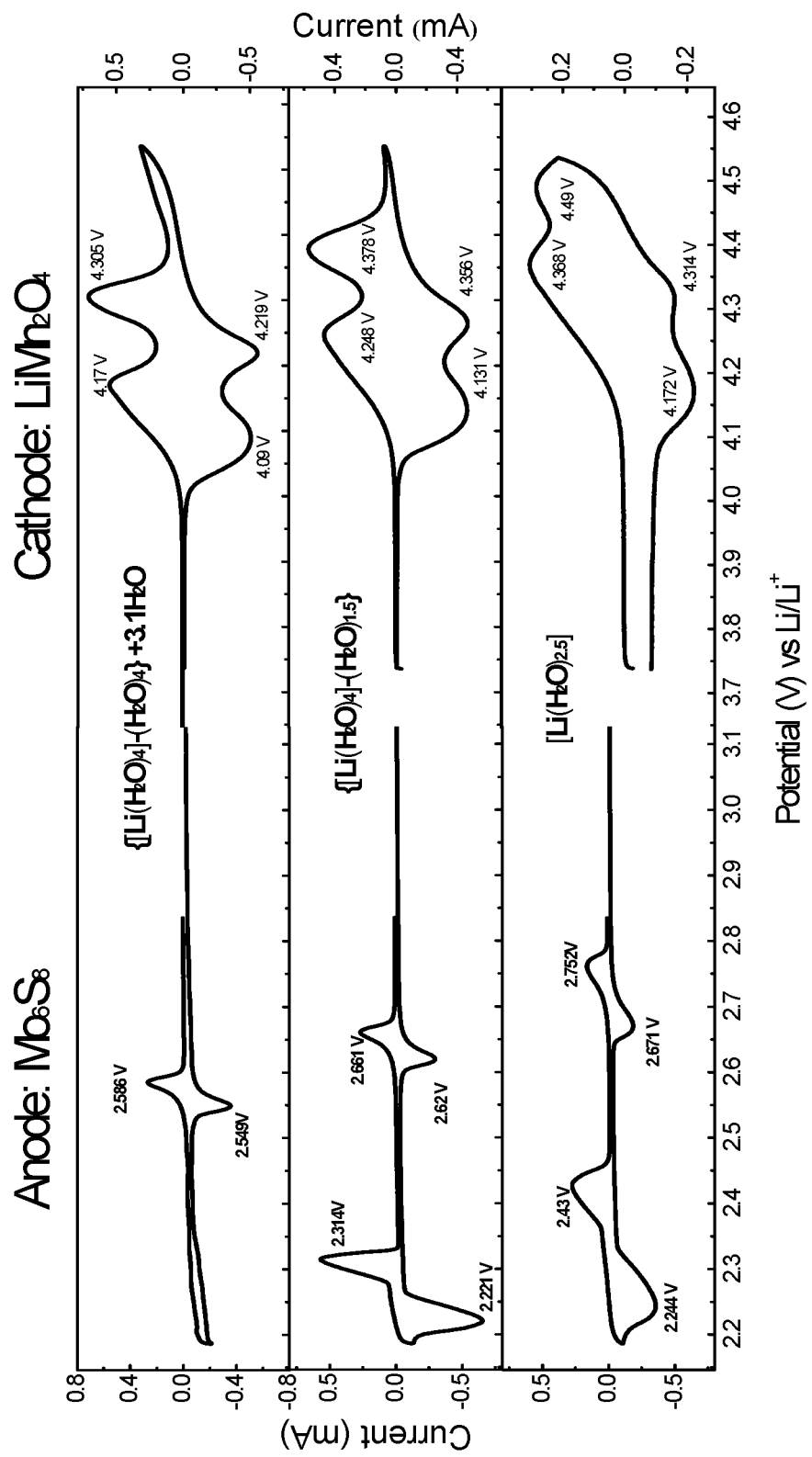
FIG. 4 shows cyclic voltammograms for three aqueous electrolytes conducted on an anode material ($Mo_6Ss$) and a cathode material ($LiMn_2O_4$). An Ag/AgCl reference electrode was used to calibrate and translate electrode potentials.
Figure 5:
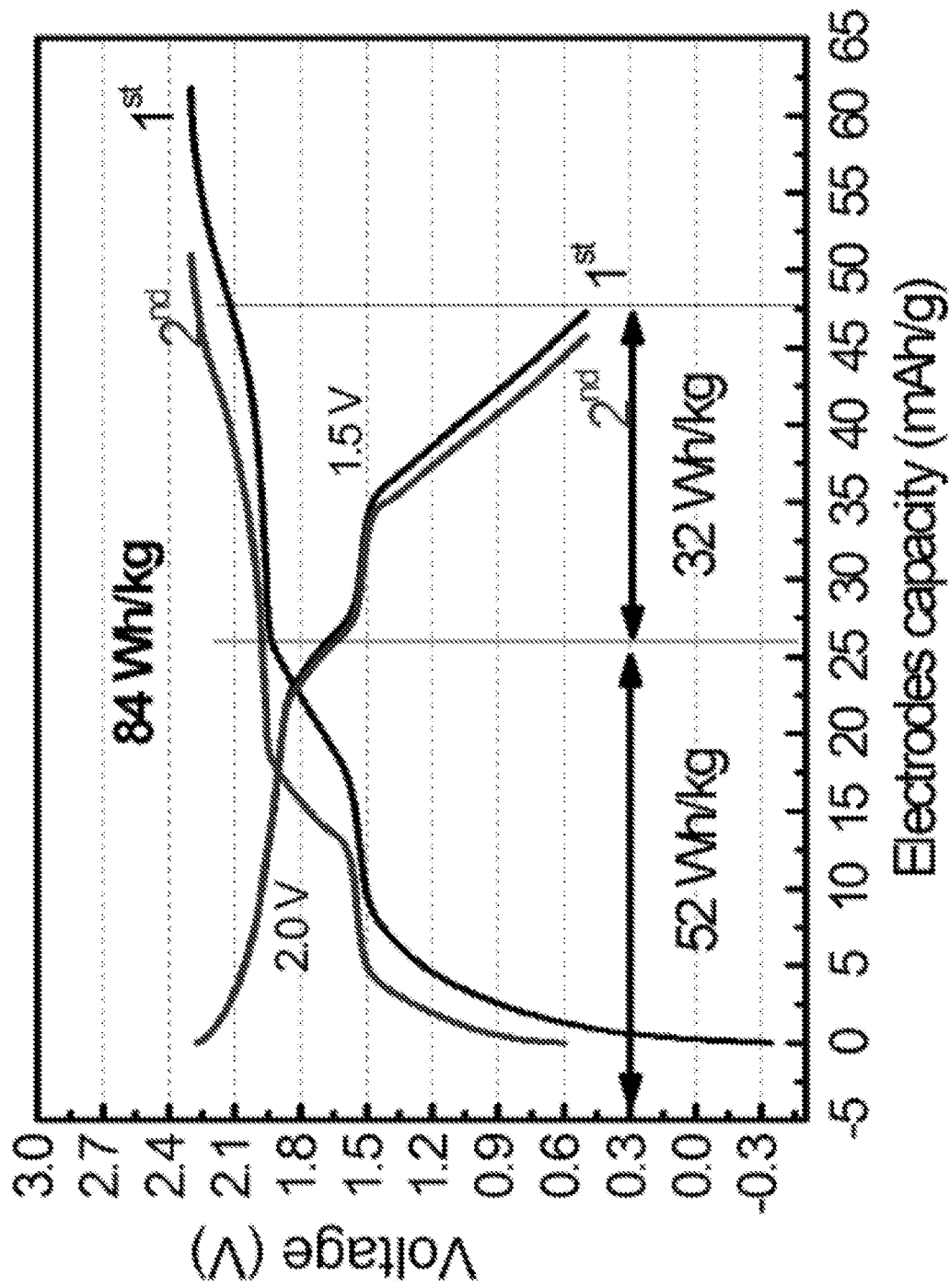
FIG. 5 is the charge and discharge curves for the 1st and 2nd cycles of high voltage aqueous Li ion full cells constructed on $Mo_6S_8$ and $LiMn_2O_4$ and an electrolyte based on 21 m LiTFSI in $H_2O$.
Figure 6:
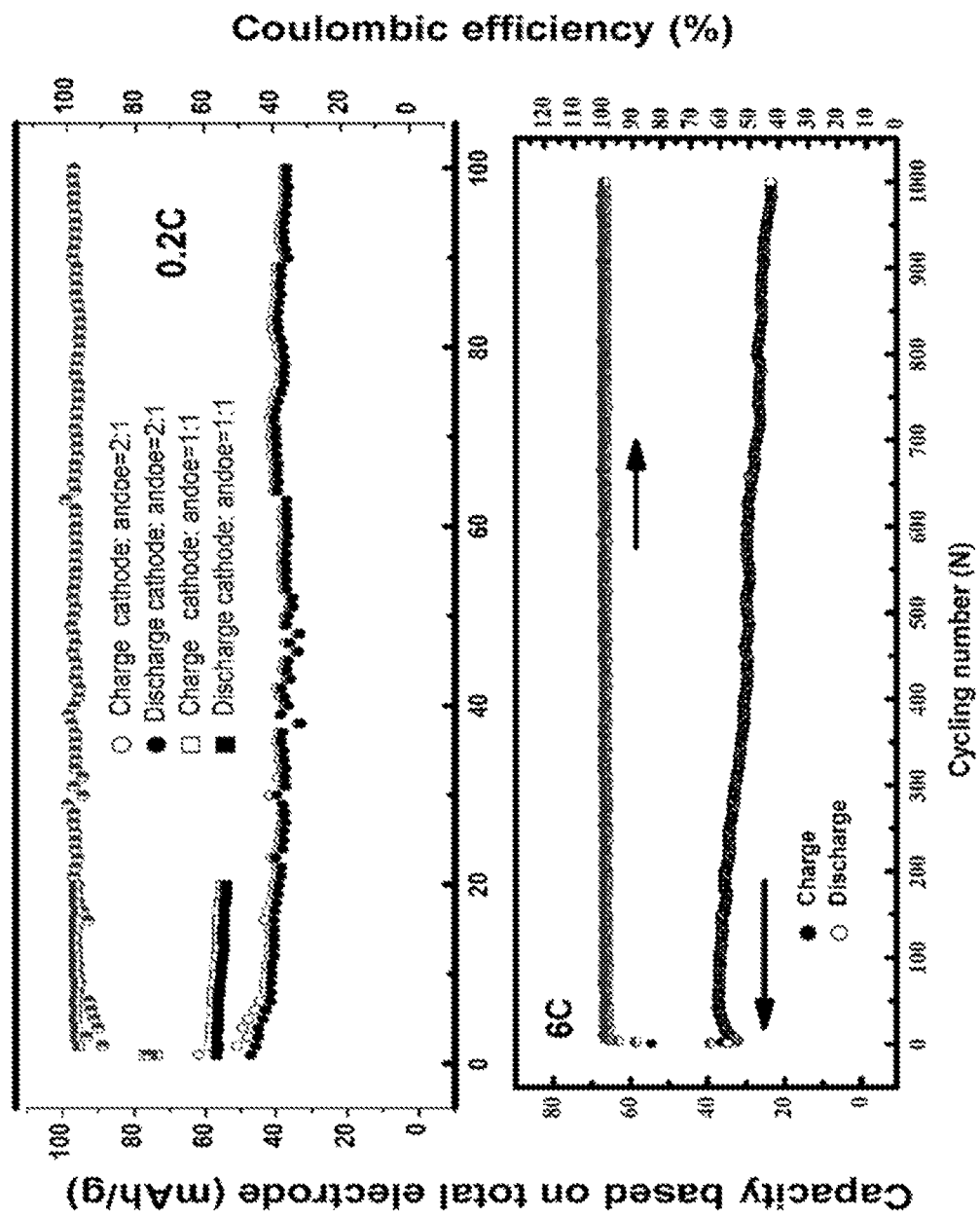
FIG. 6 is the cycling stability of aqueous Li ion full cells constructed on $Mo_6S_8$ and $LiMn_2O_4$ and an electrolyte based on 21 M LiTFSI in $H_2O$.
Figure 7:
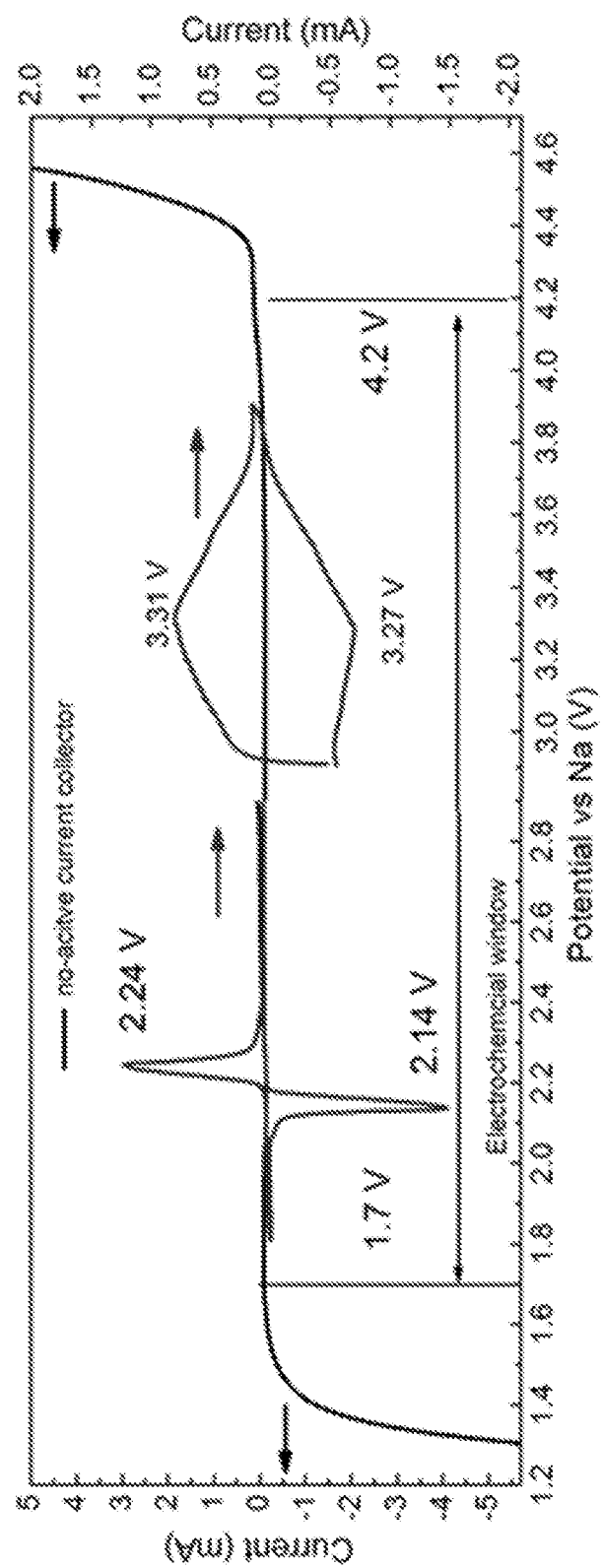
FIG. 7 shows a cyclic voltammogram for an aqueous electrolyte 8 m NaTFSI in $H_2O$, using active anode ($NaTi_2PO_4$) and cathode ($Na_{0.66}[Mn_{0.66}Ti_{0.34}]O_2$) materials at a scanning rate of 0.1 mV/s. The curves of active material CV responses are overlaid with the 1st CV traces obtained on inert stainless steel electrodes.
Figure 8:
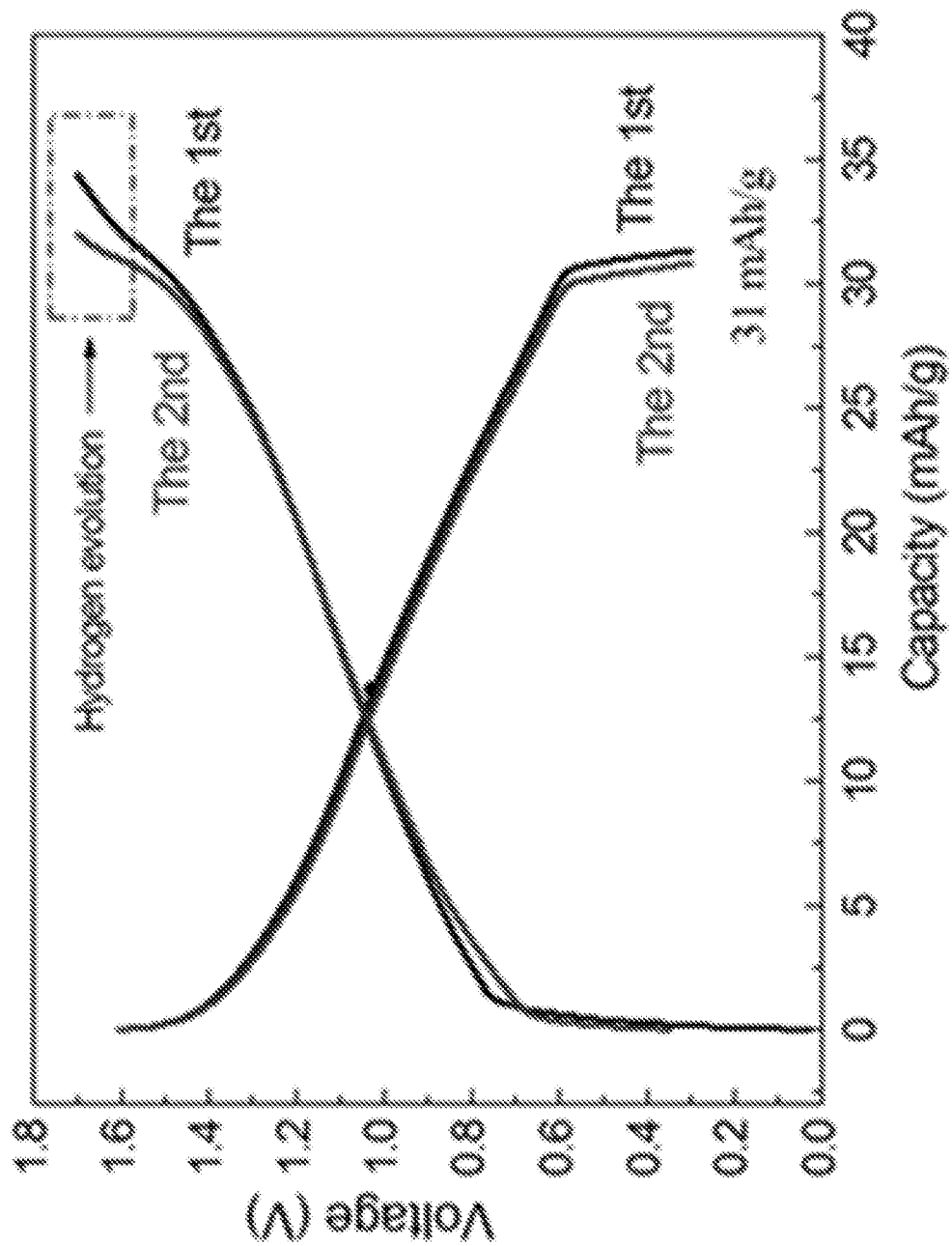
FIG. 8 shows the cycling charge/discharge profile (voltage vs. capacity) conducted using an electrolyte based on 9.26 m $Na(SO_3CF_3)$ in $H_2O$. Electrodes for this battery cell were $Na_{0.66}[Mn_{0.66}Ti_{0.34}]O_2/NaTi_2PO_4$. An Ag/AgCl reference electrode was used to calibrate and translate electrode potentials.
Figure 9:
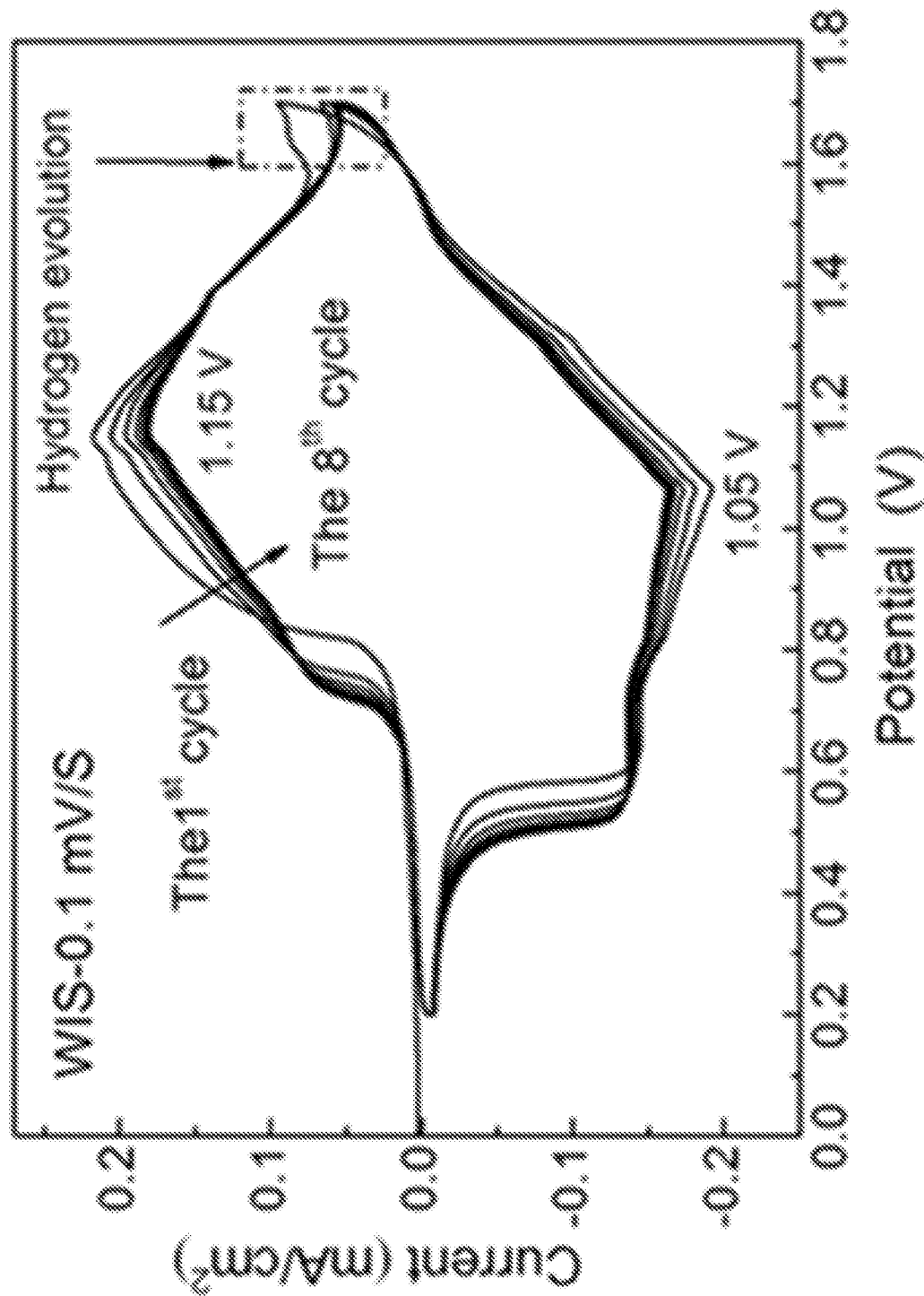
FIG. 9 shows a cyclic voltammogram of a hybrid electrolyte conducted on $Na_{0.66}[Mn_{0.66}Ti_{0.34}]O_2/NaTi_2PO_4$ using the electrolyte 9.26 m $Na(SO_3CF_3)$ in $H_2O$. The overlaid CV curves show hydrogen evolved in the first charge/discharge cycle as well as evolution of the voltage/current diagram with repeated cycling. An Ag/AgCl reference electrode was used to calibrate and translate electrode potentials.

Using 2032 coin cells, a $LiMn_2O_4$ or $Mo_6S_8$ working electrode was assembled into a matching full Li-ion cell, which was cycled at both low current (0.15 C) and high current (6 C) rates galvanostatically. FIGS. 4 and 5 show the voltage profiles and the cycling stability of the full Li-ion cells.

Example 8

Formulating Super-Concentrated Aqueous Electrolytes

To a vial containing 2.42 g (8.0 mmol) NaTFSI, 1.0 mL (55 mmol) of distilled water was added. The mixture was stirred and heated to 50° C. to obtain a homogenous solution. A similar procedure was followed when NaTF was used as the sodium salt.

Example 9

Formulating Super-Concentrated Hybrid Electrolytes

To a vial containing 1.52 g (5.0 mmol) NaTFSI, 0.5 mL (28 mmol) of distilled water and 0.5 mL (7.5 mmol) of EC were added. The mixture was stirred and heated at 50° C. to obtain a homogenous solution. A similar procedure was followed when NaTF was used as the sodium salt.

Example 10

Formulating Super-Concentrated Hybrid Electrolytes with Additive

To a vial containing more than 2.0 mmol (0.150 g) $MgSO_4$, 0.5 mL (28 mmol) of distilled water, 0.5 mL (7.5 mmol) of EC, and 0.12 g (113 mmol) of FEC were added. The mixture was stirred and heated to 50° C. before a homogenous solution was obtained. A similar procedure was followed for sodium salts such as NaTF and NaTFSI.

Table 2 lists additional electrolyte solutions that were prepared using a similar procedure.

TABLE 2

Selected Sodium, Potassium, and Magnesium Electrolyte Formulations

| Salt Concentration (m) | Solvent Ratio (by weight) | Additional Solvent Concentration (by weight) |
|---|---|---|
| NaTFSI 8.0 m | water | |
| NaFSI 8.0 m | water | |
| Na($SO_3CF_3$) 9.26 m | water | |
| NaTFSI 4.0 m | EC/water (50:50) | |
| NaTFSI 4.0 m | EC/water (50:50) | FEC (5%) |
| KTFSI 4.0 m | PC/water (50:50) | |
| KBETI 4.0 m | PC/water (50:50) | FEC (5%) |
| Mg(TFSI)$_2$ 4.5 m | GBL/water (50:50) | FEC (5%) |
| NaTFSI 15.0 m | EC/water (20:80) | |
| NaTFSI 15.0 m | EC/water (20:80) | FEC (10%) |
| NaTFSI 15.0 m | VC/water (10:90) | EC (3%) |

Example 11

Cyclic Voltammogram of Aqueous and Hybrid Electrolytes on Stainless Steel Electrodes Using a three electrode configuration, a 316 stainless steel working electrode was polarized anodically or cathodically in 8 m NaTFSI in $H_2O$ at a scan rate of 10 mV/s against an Ag/AgCl reference electrode to +1.80 V and −1.80 V, respectively. FIG. 1 shows the full electrochemical stability window of this aqueous electrolyte. For convenience of viewing, the potential coordinates in FIG. 1 was translated into one against Na/Na$^+$ reference electrode.

Example 12

Cycling Profile of an Na Electrolyte on Titanium-Based Electrodes

Using a 316 stainless steel CR2032 battery cell, 9.26 m $Na(SO_3CF_3)$ in $H_2O$ was cycled between $Na_{0.66}[Mn_{0.66}Ti_{0.34}]O_2/NaTi_2PO_4$ electrodes from 0 V to 1.7 V cell potential. FIG. 2 shows the first two cycles of this aqueous electrolyte with sodium storage electrodes.

Example 13

Cyclic Voltammogram of Aqueous Electrolyte on Active Electrodes

Using a two electrode configuration, $Na_{0.66}[Mn_{0.66}Ti_{0.34}]O_2/NaTi_2PO_4$ working electrodes were polarized anodically or cathodically in 9.26 m $Na(SO_3CF_3)$ in $H_2O$ at a scan rate of 0.10 mV/s against an Ag/AgCl reference electrode to 0 V and 1.80 V, respectively. FIG. 3 shows the full electrochemical stability window of this aqueous electrolyte. For convenience of viewing, the potential coordinates in FIG. 3 was translated into one against Na$^+$/Na reference electrode.

Example 14

High Voltage Aqueous Li-Ion Battery

A full Li-ion cell using $LiMn_2O_4$ cathode and $Mo_6S_8$ anode was assembled to evaluate the viability of an aqueous electrolyte at 21 m. The cathode/anode mass ratio was set to 2:1 in order to compensate for the irreversible capacity at the $Mo_6S_8$ anode due to formation of SEI during the initial cycles. At 0.15 C the cell displays two voltage plateaus at 1.52 V and 2.10 V, respectively, delivering a discharge capacity of 47 mAh/g (of total electrode mass). A conservative estimate made on the basis of average voltage and capacity places the energy density in the vicinity of 84 Wh/Kg (of total electrode mass). To further explore the energy density achievable in the ideal scenario where Li$^+$-consumption was minimized during the initial interphase formation, a $Mo_6S_8$ anode recovered from a cycled full cell was matched with a fresh $LiMn_2O_4$ cathode at a 1:1 ratio. Such a full cell delivered an energy density of 100 Wh/Kg (of total electrode mass). A full aqueous Li-ion cell using $Mo_6S_8$ and $LiNi_{0.8}Co_{0.15}Al_{0.05}O_2$ cathode also cycled reversibly but yielded a lower capacity.

Figure 13:
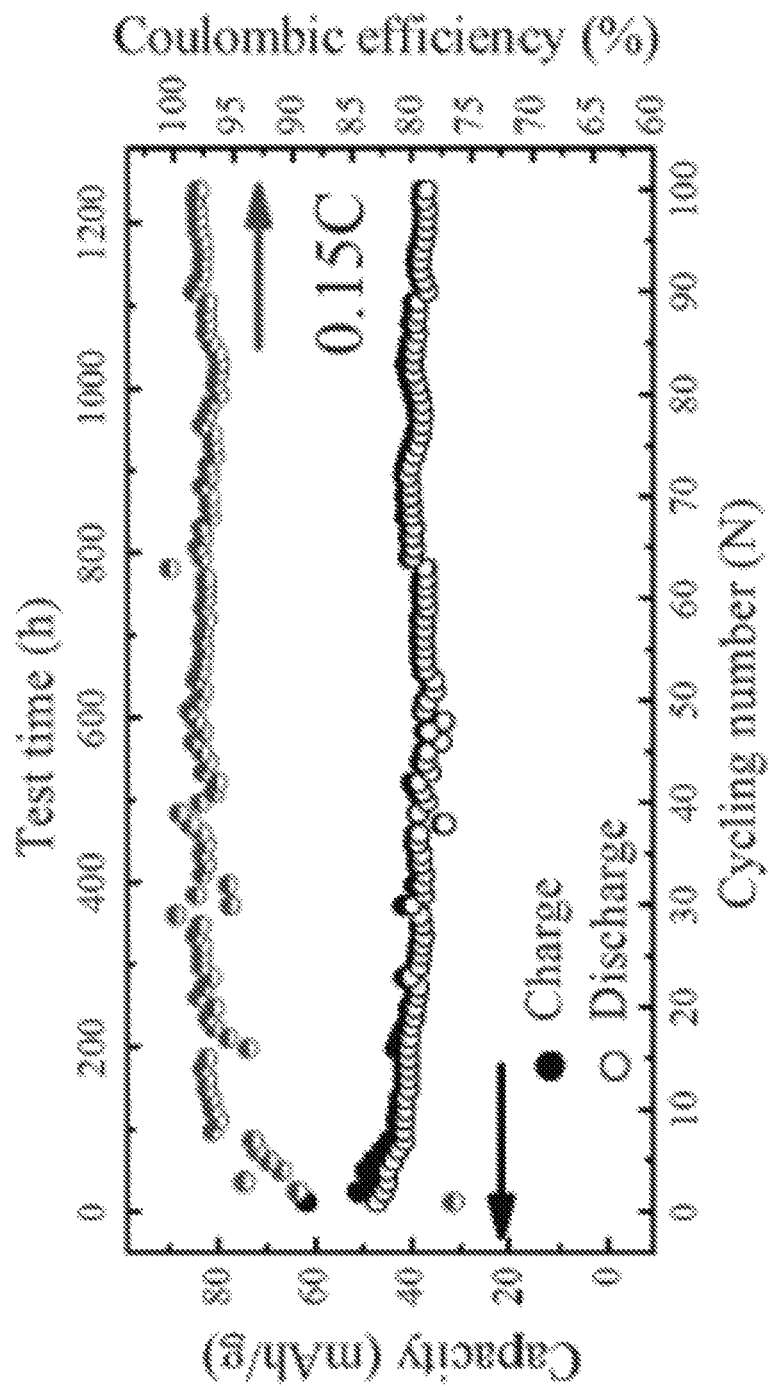
FIG. 13 is a graph of the cycling stabilities and the Coulombic efficiencies of full aqueous Li-ion cells employing $Mo_6S_8$ and $LiMn_2O_4$ as anode and cathode materials in 21 m LiTFSI solution at a low (0.15 C) rate.
Figure 14:
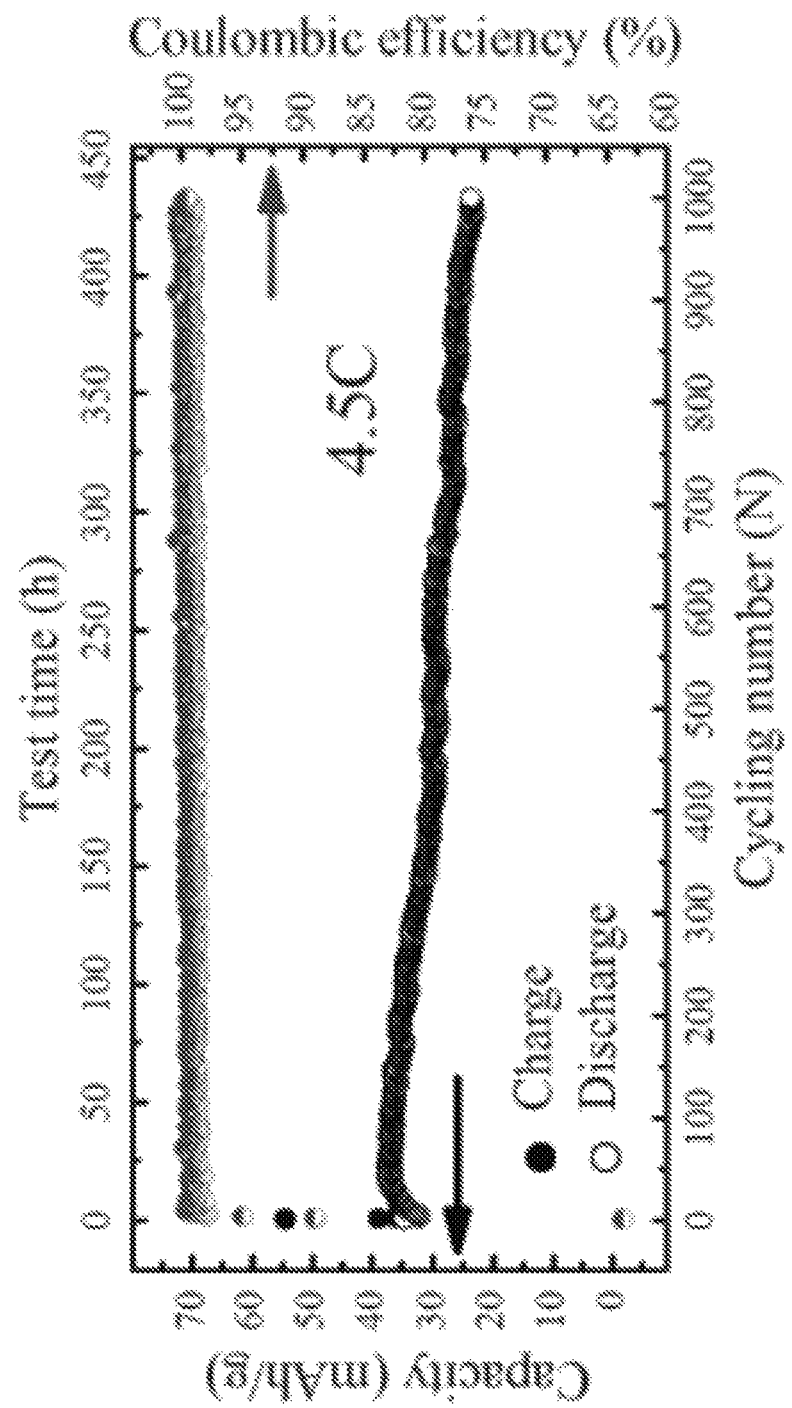
FIG. 14 is graph of the cycling stabilities and the Coulombic efficiencies of full aqueous Li-ion cells employing $Mo_6S_8$ and $LiMn_2O_4$ as anode and cathode materials in 21 m LiTFSI solution at a high (4.5 C) rate.
Figure 15:
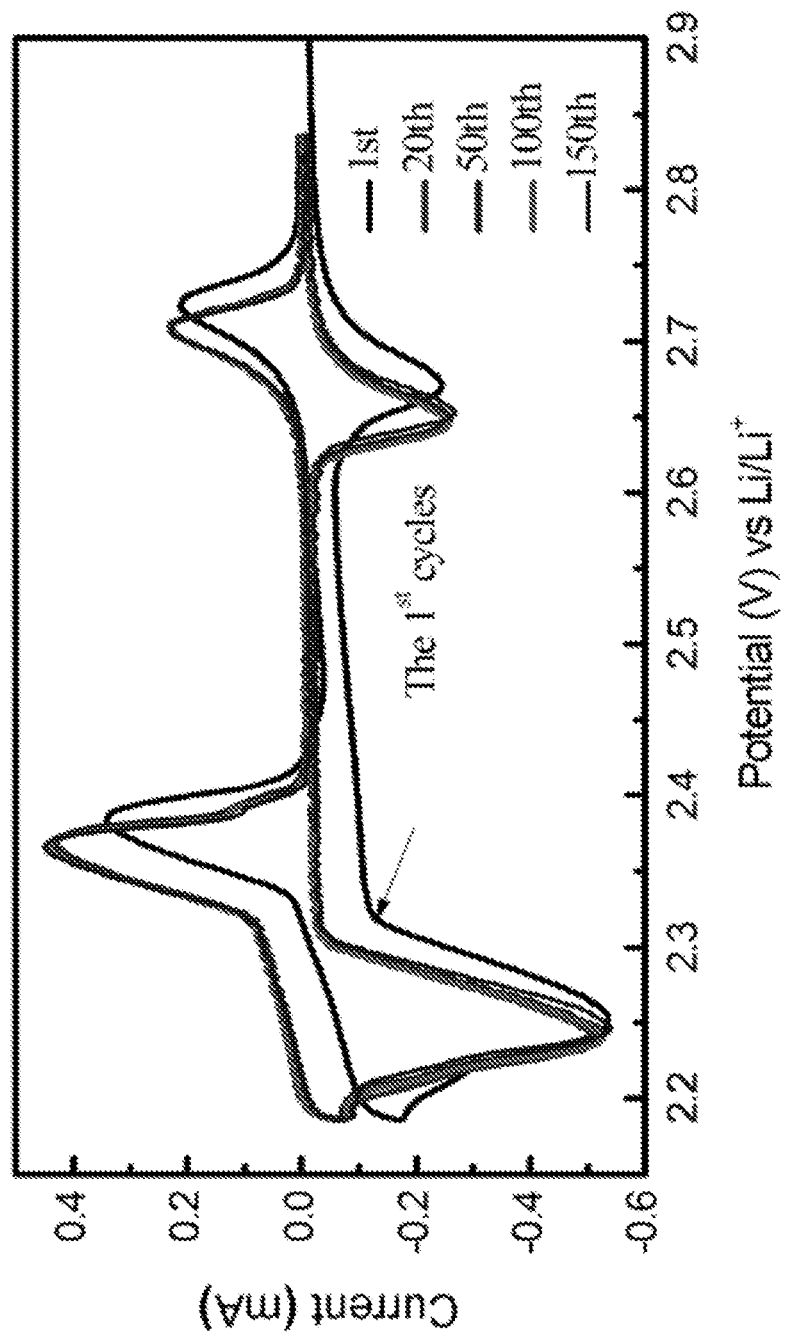
FIG. 15 is a graph of selected CV scans for a $Mo_6S_8$ working electrode with 21 m electrolyte at a scanning rate of 0.1 mV/s. The data was collected using a three-electrode device with Ag/AgCl as a reference and the potential scale has been converted to a Li reference for convenience.
Figure 16:
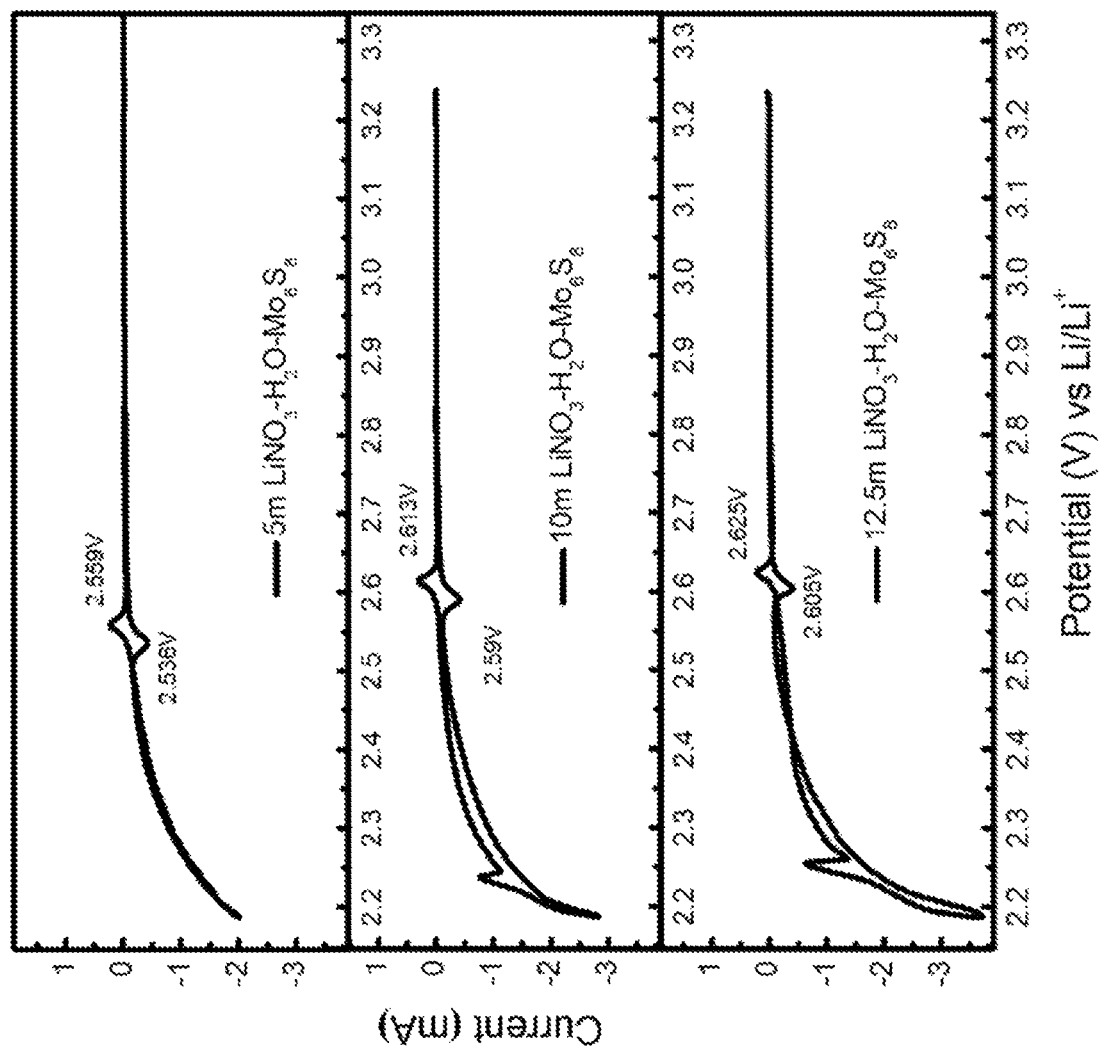
FIG. 16 is a graph showing the electrochemical stability window of electrolytes at various $LiNO_3$ concentrations as measured with CV on $Mo_6S_8$ working electrodes at 0.1 mV/s. The data was collected using a three-electrode device with Ag/AgCl as a reference and the potential scale has been converted to a Li reference for convenience.
Figure 17:
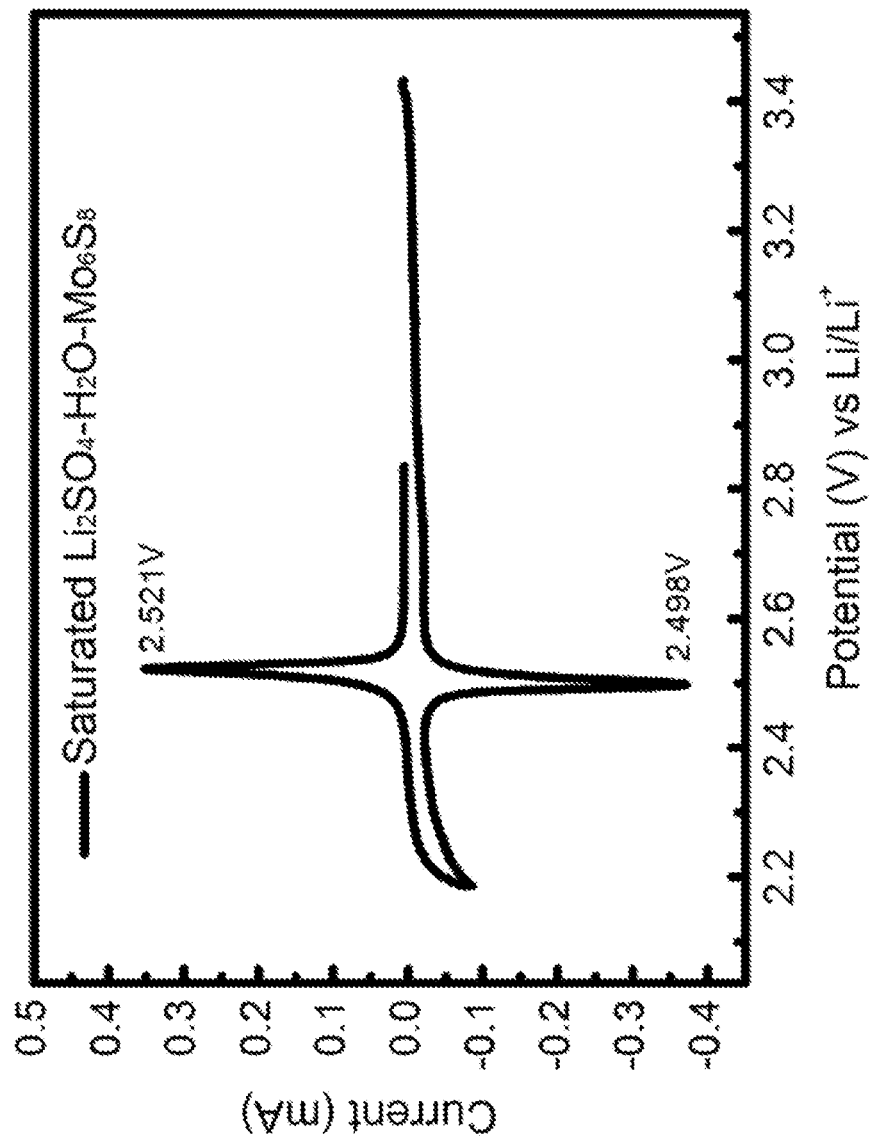
FIG. 17 is graph showing the electrochemical stability window of a saturated $Li_2SO_4$ solution (<3 m) as measured with CV on $Mo_6S_8$ working electrodes at 0.1 mV/s. The data was collected using a three-electrode device with Ag/AgCl as a reference and the potential scale has been converted to a Li reference for convenience.

FIGS. 13 and 14 display the cycling stability and Coulombic efficiency of $LiMn_2O_4/Mo_6S_8$ full cells at both high (4.5 C) and low (0.15 C) rates. Excellent stability with high capacity retention (68% with 1000 cycles at 4.5 C and 78% with 100 cycles at 0.15 C) and near 100% Coulombic efficiency were observed at both rates. The most rigorous proof of stability does not come from the number of cycles, but from the time spent by a system at a fully charged state, as well as from high Coulombic efficiency at low C-rates. Burn, J. C., et al., *J. Electrochem. Soc.* 158:A255 (2011). In previous studies, the cycling stability of aqueous Li-ion cells was often tactically evaluated at high instead of low rates, so that the effect of residual hydrogen/oxygen evolution on cycling stability would be less apparent. To reveal how much impact the trace parasitic reactions in an aqueous electrolyte exert on full Li-ion cell performance, the open-circuit voltage decay of fully charged cells was monitored upon storage, which was followed by an immediate measurement of recoverable capacity. The results confirmed the negligible effect of either hydrogen or oxygen evolution. Only in longer term cycling tests would the effect of parasitic reactions become more apparent, as evidenced by the slow but steady capacity fading shown in FIGS. 13 and 14, suggesting that the interphasial chemistry needs to be tailored for more effective protection. Elevated temperature (45° C.) did not induce accelerated capacity fading, indicating that the SEI formed should be stable against dissolution.

Figure 18:
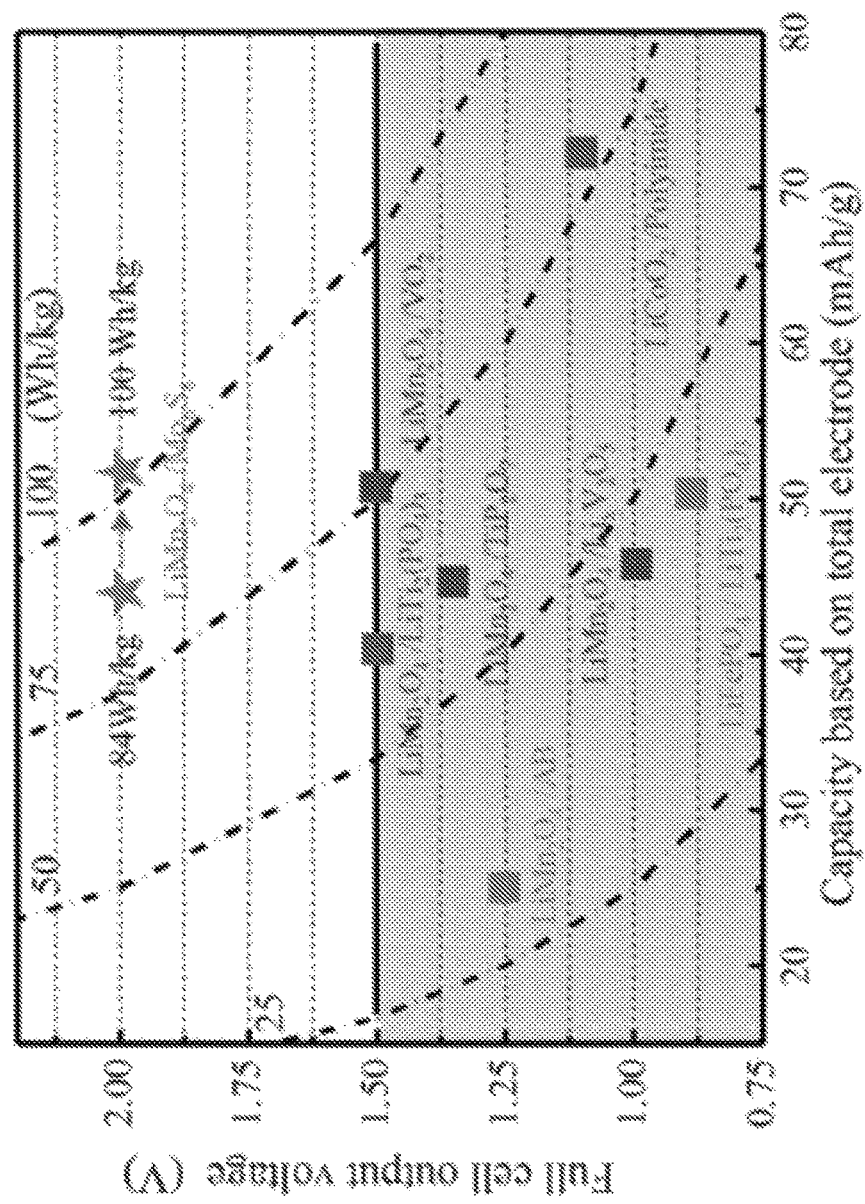
FIG. 18 is a graph comparing the performances for aqueous Li-ion batteries based on various electrochemical couples.

An aqueous battery was plotted in FIG. 18 against other aqueous systems previously investigated using these parameters, in which the cycling stability is color-coded with red, blue and green representing <100 cycles, 100-200 cycles, and >1000 cycles, respectively. More than 1000 cycles were reported for electrochemical couples of $LiMn_2O_4$/acetylene black (37) and $LiFePO_4/LiTi_2(PO_4)_3$. Luo, J.-Y., et al., *Nat. Chem.* 2:760-765 (2010). Their excellent stability, however, was achieved at the expense of voltage (<1.25 V) and energy density (<50 Wh/kg). On the other hand, efforts to increase cell voltage to ~1.50 V were accompanied by an appreciable compromise in cycling stability. See Li, W., et al., *Science* 264:115-118 (1994); Luo, J.-Y., et al., *Adv. Funct. Mater.* 17:3877-3884 (2004); Wang, H., et al., *Electrochim. Acta.* 52:5102-5107 (2007); Wang, H., et al., *Electrochim. Acta.* 52:3280-3285 (2007); and Qin, H., et al., *J. Power Sources* 249:367-372 (2014). In all cases, energy densities were below 75 Wh/Kg. The formation of an anode/electrolyte interphase in the aqueous electrolyte enabled us to decouple voltage from cycling stability and achieve high in both.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. An electrolyte, comprising:
   (a) at least one metal salt; and
   (b) a solvent comprising between about 1% and about 100% water by weight;
   wherein the molal concentration of the at least one metal salt in the electrolyte is between about 15 m and 100 m when water is the only solvent or the molal concentration of the at least one metal salt in the electrolyte is between about 5 m and 100 m when the solvent comprises water and at least one non-aqueous solvent, and wherein the electrochemical stability window of the electrolyte is between about 2.0 V and about 5.0 V.

2. The electrolyte of claim 1, wherein the at least one metal salt comprises an anion selected from the group consisting of bis(trifluoromethane sulfonyl)imide (TFSI), trifluoromethane sulfonate (TF), bis(fluorosulfonyl)imide (FSI), tetrafluorophosphate ($BF_4$), hexafluorophosphate ($PF_6$), bis(pentafluoroethane sulfonyl) imide (BETI), 4,5-dicyano-2-trifluoromethanoimidazole (DCMI), [fluoro(non-afluorobutane) sulfonyl]imide (FNF), perchlorate ($ClO_4$), sulfate ($SO_4$), and nitrate ($NO_3$).

3. The electrolyte of claim 2, wherein the at least one metal salt is selected from the group consisting of LiTFSI, LiTF, LiFSI, LiBETI, LiDCMI, LiFNF, $LiClO_4$, $LiSO_4$, $LiNO_3$, NaTFSI, NaTF, NaFSI, NaBETI, NaDCMI, NaFNF, $NaClO_4$, $NaSO_4$, $NaNO_3$, KTFSI, KTF, KFSI, KBETI, KDCMI, KFNF, $KClO_4$, $KSO_4$, $KNO_3$, $Mg(TFSI)_2$, $Mg(TF)_2$, $Mg(FSI)_2$, $Mg(BETI)_2$, $Mg(DCMI)_2$, $Mg(FNF)_2$, $Mg(ClO_4)_2$, $Mg(SO_4)_2$, $Mg(NO_3)_2$, $Al(TFSI)_3$, $Al(TF)_3$, $Al(FSI)_3$, $Al(BETI)_3$, $Al(DCMI)_3$, $Al(FNF)_3$, $Al(ClO_4)_3$, $Al(SO_4)_3$, and $Al(NO_3)_3$.

4. The electrolyte of claim 3, wherein the at least one metal salt is selected from the group consisting of LiTFSI, LiTF, NaTFSI, NaFSI, KTFSI, KBETI, and $Mg(TFSI)_2$.

5. The electrolyte of claim 1, wherein the solvent comprises water and at least one non-aqueous solvent.

6. The electrolyte of claim 5, wherein the weight ratio of the at least one non-aqueous solvent in the solvent is between about 10% and about 90%.

7. The electrolyte of claim 5, wherein the at least one non-aqueous solvent is an organic solvent.

8. The electrolyte of claim 5, wherein the at least one non-aqueous solvent is an organic solvent selected from the group consisting of ethylene carbonate, fluoroethylene carbonate, propylene carbonate, γ-butyrolactone, and vinylene carbonate.

9. The electrolyte of claim 5, comprising two non-aqueous solvents, wherein at least one non-aqueous solvent is ethylene carbonate or fluoroethylene carbonate.

10. The electrolyte of claim 1, wherein the electrolyte has an electrochemical stability window of between about 2.3 V and about 4.9 V.

11. The electrolyte of claim 1, wherein the at least one metal salt is selected from the group consisting of LiTFSI, NaTFSI, NaFSI, $Na(SO_3CF_3)$, KTFSI, and $Mg(TFSI)_2$, wherein the solvent comprises water and at least one non-aqueous solvent selected from the group consisting of ethylene carbonate, fluoroethylene carbonate, propylene carbonate, butyrolactone, and vinylene carbonate, and wherein the solvent comprises water at a weight ratio of between about 40% and about 100%.

12. The electrolyte of claim 1, comprising:
(a) the at least one metal salt comprises LiTFSI and the at least one non-aqueous solvent comprises fluoroethylene carbonate, wherein the solvent comprises water at a weight ratio of 90%;
(b) the at least one metal salt comprises LiTFSI and the at least one non-aqueous solvent comprises ethylene carbonate, wherein the solvent comprises water at a weight ratio of 50%;
(c) the at least one metal salt comprises LiTFSI and the at least one non-aqueous solvent comprises ethylene carbonate and fluoroethylene carbonate, wherein the solvent comprises water at a weight ratio of 47.5%;
(d) the at least one metal salt comprises LiTFSI and the at least one non-aqueous solvent comprises polyethylene carbonate, wherein the solvent comprises water at a weight ratio of 50%;
(e) the at least one metal salt comprises LiTFSI and the at least one non-aqueous solvent comprises polyethylene carbonate and fluoroethylene carbonate, wherein the solvent comprises water at a weight ratio of 47.5%;
(f) the at least one metal salt comprises LiTFSI and the at least one non-aqueous solvent comprises γ-butyrolactone and fluoroethylene carbonate, wherein the solvent comprises water at a weight ratio of 47.5%;
(g) the at least one metal salt comprises LiTFSI and the at least one non-aqueous solvent comprises ethylene carbonate, wherein the solvent comprises water at a weight ratio of 80%;
(h) the at least one metal salt comprises LiTFSI and the at least one non-aqueous solvent comprises ethylene carbonate and fluoroethylene carbonate, wherein the solvent comprises water at a weight ratio of 72%; or
(i) the at least one metal salt comprises LiTFSI and the at least one non-aqueous solvent comprises vinylene carbonate and fluoroethylene carbonate, wherein the solvent comprises water at a weight ratio of 87%;
(j) the at least one metal salt comprises NaTFSI and the at least one non-aqueous solvent comprises ethylene carbonate, wherein the solvent comprises water at a weight ratio of 50%;
(k) the at least one metal salt comprises NaTFSI and the at least one non-aqueous solvent comprises ethylene carbonate and fluoroethylene carbonate, wherein the solvent comprises water at a weight ratio of 47.5%;
(l) the at least one metal salt comprises KTFSI and the at least one non-aqueous solvent comprises polyethylene carbonate, wherein the solvent comprises water at a weight ratio of 50%;
(m) the at least one metal salt comprises KBETI and the at least one non-aqueous solvent comprises polyethylene carbonate and fluoroethylene carbonate, wherein the solvent comprises water at a weight ratio of 47.5%;
(n) the at least one metal salt comprises $Mg(TFSI)_2$ and the at least one non-aqueous solvent comprises γ-butyrolactone and fluoroethylene carbonate, wherein the solvent comprises water at a weight ratio of 47.5%;
(o) the at least one metal salt comprises NaTFSI and the at least one non-aqueous solvent comprises ethylene carbonate, wherein the solvent comprises water at a weight ratio of 80%;
(p) the at least one metal salt comprises NaTFSI and the at least one non-aqueous solvent comprises ethylene carbonate and fluoroethylene carbonate, wherein the solvent comprises water at a weight ratio of 72%; or
(q) the at least one metal salt comprises LiTFSI and the at least one non-aqueous solvent comprises vinylene carbonate and ethylene carbonate, wherein the solvent comprises water at a weight ratio of 87%.

13. A battery cell comprising the electrolyte of claim 1; a positive electrode; and a negative electrode.

14. The battery cell of claim 13, wherein the positive electrode is selected from the group consisting of $LiMn_2O_4$, $LiCoO_2$, $LiNi_{0.33}Mn_{0.33}Co_{0.33}O_2$, $LiNi_{0.5}Mn_{1.5}O_2$, $LiCoPO_4$, and $LiNiPO_4$.

15. The battery cell of claim 13, wherein the negative electrode is selected from the group consisting of lithium, magnesium, aluminum, zinc, chromium, iron, nickel, tin, lead, hydrogen, copper, silver, palladium, mercury, platinum, gold, molybdenum, sulfur, combinations thereof, and oxides thereof.

16. The battery cell of claim 13, wherein the negative electrode is $Mo_6S_8$ and the positive electrode is $LiMn_2O_4$.

17. The battery cell of claim 13, wherein the number of cycles of the battery cell at a C-rate of about 4.5 C is between about 10 and about 500.

18. The battery cell of claim 13, wherein the number of cycles of the battery cell at a C-rate of about 1.5 C is between about 500 and about 2000.

* * * * *